(12) United States Patent
Molnar, Jr. et al.

(10) Patent No.: US 12,209,541 B1
(45) Date of Patent: Jan. 28, 2025

(54) ADJUSTABLE FAN TRACK LINER WITH DUAL SLOTTED ARRAY ACTIVE FAN TIP TREATMENT FOR DISTORTION TOLERANCE

(71) Applicants: Rolls-Royce North American Technologies Inc., Indianapolis, IN (US); Rolls-Royce Corporation, Indianapolis, IN (US)

(72) Inventors: Daniel E. Molnar, Jr., Indianapolis, IN (US); Robert W. Heeter, Indianapolis, IN (US); Jonathan M. Rivers, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/660,065

(22) Filed: May 9, 2024

(51) Int. Cl.
| | |
|---|---|
| *F04D 29/68* | (2006.01) |
| *F01D 25/24* | (2006.01) |
| *F02C 9/16* | (2006.01) |
| *F01D 11/08* | (2006.01) |
| *F04D 29/52* | (2006.01) |

(52) U.S. Cl.
CPC ............... *F02C 9/16* (2013.01); *F01D 25/24* (2013.01); *F01D 11/08* (2013.01); *F04D 29/526* (2013.01); *F04D 29/685* (2013.01); *F05D 2220/36* (2013.01)

(58) Field of Classification Search
CPC ...... F04D 29/685; F04D 29/526; F01D 11/08; F01D 11/22
See application file for complete search history.

(56) References Cited

U.S. PATENT DOCUMENTS

| | | |
|---|---|---|
| 4,086,022 A | 4/1978 | Freeman et al. |
| 4,155,680 A | 5/1979 | Linko, III et al. |
| 4,239,452 A | 12/1980 | Frank, Jr. |
| 5,137,419 A | 8/1992 | Waterman |
| 5,308,225 A | 5/1994 | Koff et al. |
| 5,474,417 A | 12/1995 | Privett et al. |
| 5,762,470 A | 6/1998 | Gelmedov et al. |
| 6,231,301 B1 | 5/2001 | Barnett et al. |
| 6,406,470 B1 | 6/2002 | Kierce |
| 6,497,551 B1 | 12/2002 | Hand et al. |
| 6,514,039 B1 | 2/2003 | Hand |
| 6,619,909 B2 | 9/2003 | Barnett et al. |
| 6,648,591 B2 | 11/2003 | Collins |
| 6,685,426 B2 | 2/2004 | Clark |

(Continued)

FOREIGN PATENT DOCUMENTS

| | | |
|---|---|---|
| CN | 201152282 Y | 11/2008 |
| CN | 104373388 B | 1/2017 |

(Continued)

*Primary Examiner* — Woody A Lee, Jr.
*Assistant Examiner* — Behnoush Haghighian
(74) *Attorney, Agent, or Firm* — Barnes & Thornburg LLP

(57) ABSTRACT

A gas turbine engine includes a fan and a fan case assembly. The fan includes a fan rotor configured to rotate about an axis of the gas turbine engine and a plurality of fan blades coupled to the fan rotor for rotation therewith. The fan case assembly extends circumferentially around the plurality of fan blades radially outward of the plurality of the fan blades.

20 Claims, 9 Drawing Sheets

(56) References Cited

U.S. PATENT DOCUMENTS

| | | | |
|---|---|---|---|
| 6,736,594 B2 * | 5/2004 | Irie | F04D 29/547 |
| | | | 415/173.1 |
| 6,742,983 B2 | 6/2004 | Schmuecker | |
| 6,832,890 B2 | 12/2004 | Booth | |
| 6,905,305 B2 | 6/2005 | James | |
| 6,935,833 B2 | 8/2005 | Seitz | |
| 7,077,623 B2 | 7/2006 | Guemmer | |
| 7,186,072 B2 | 3/2007 | Seitz | |
| 7,210,905 B2 | 5/2007 | Lapworth | |
| 7,575,412 B2 | 8/2009 | Seitz | |
| 7,967,556 B2 | 6/2011 | Guemmer | |
| 8,043,046 B2 | 10/2011 | Guemmer | |
| 8,152,444 B2 | 4/2012 | Guemmer | |
| 8,152,445 B2 | 4/2012 | Guemmer | |
| 8,152,467 B2 | 4/2012 | Guemmer | |
| 8,182,209 B2 | 5/2012 | Brault et al. | |
| 8,192,148 B2 | 6/2012 | Guemmer | |
| 8,257,022 B2 | 9/2012 | Guemmer | |
| 8,262,340 B2 | 9/2012 | Guemmer | |
| 8,337,146 B2 | 12/2012 | Yu | |
| 8,403,630 B2 | 3/2013 | Guemmer | |
| 8,419,355 B2 | 4/2013 | Guemmer et al. | |
| 8,602,720 B2 | 12/2013 | Goswami et al. | |
| 8,845,269 B2 | 9/2014 | Agneray et al. | |
| 8,915,699 B2 | 12/2014 | Brignole et al. | |
| 9,638,213 B2 | 5/2017 | Obrecht et al. | |
| 9,651,060 B2 | 5/2017 | Morel et al. | |
| 9,816,528 B2 | 11/2017 | Johann | |
| 9,957,976 B2 | 5/2018 | Allford | |
| 10,024,336 B2 | 7/2018 | Obrecht et al. | |
| 10,047,620 B2 | 8/2018 | Giacché et al. | |
| 10,066,640 B2 | 9/2018 | Bennington et al. | |
| 10,378,550 B2 * | 8/2019 | Lim | F04D 29/685 |
| 10,450,869 B2 | 10/2019 | Brignole et al. | |
| 10,539,154 B2 | 1/2020 | Mallina et al. | |
| 10,914,318 B2 | 2/2021 | Capozzi et al. | |
| 11,078,805 B2 | 8/2021 | Joly et al. | |
| 11,092,030 B2 * | 8/2021 | Joly | F04D 29/685 |
| 11,131,322 B2 | 9/2021 | Grothe et al. | |
| 11,473,438 B2 | 10/2022 | Reynolds et al. | |
| 11,572,897 B1 * | 2/2023 | Duong | F04D 27/0246 |
| 11,686,207 B2 | 6/2023 | Brignole et al. | |
| 11,702,945 B2 | 7/2023 | Heeter et al. | |
| 11,732,612 B2 | 8/2023 | Molnar, Jr. et al. | |
| 2003/0002982 A1 * | 1/2003 | Irie | F04D 15/0027 |
| | | | 415/220 |
| 2005/0226717 A1 | 10/2005 | Xu | |
| 2007/0147989 A1 | 6/2007 | Collins | |
| 2008/0044273 A1 | 2/2008 | Khalid | |
| 2009/0065064 A1 | 3/2009 | Morris et al. | |
| 2010/0310353 A1 | 12/2010 | Yu | |
| 2012/0269619 A1 | 10/2012 | Johann | |
| 2012/0315131 A1 * | 12/2012 | Mertens | F04D 27/0215 |
| | | | 415/126 |
| 2014/0119883 A1 | 5/2014 | Kempf | |
| 2015/0086344 A1 | 3/2015 | Guemmer | |
| 2016/0010652 A1 * | 1/2016 | Lim | F04D 27/002 |
| | | | 415/128 |
| 2016/0230776 A1 | 8/2016 | Bennington et al. | |
| 2018/0163562 A1 | 6/2018 | Khare et al. | |
| 2020/0224675 A1 | 7/2020 | Capozzi et al. | |
| 2020/0332673 A1 * | 10/2020 | Joly | F01D 9/047 |

FOREIGN PATENT DOCUMENTS

| | | |
|---|---|---|
| CN | 110242616 A | 9/2019 |
| CN | 113217469 A | 8/2021 |
| DE | 60201109 T2 | 10/2004 |
| DE | 102007056953 A1 | 5/2009 |
| DE | 102011007767 A1 | 10/2012 |
| DE | 102013210169 A1 | 12/2014 |
| DE | 102018203304 A1 | 9/2019 |
| EP | 2268926 B1 | 8/2011 |
| EP | 2434164 | 3/2012 |
| EP | 2434164 A1 | 3/2012 |
| EP | 3081779 | 10/2016 |
| EP | 3081779 A1 | 10/2016 |
| EP | 3591237 A1 | 1/2020 |
| EP | 3006679 B1 | 9/2023 |
| FR | 3122450 A1 | 11/2022 |
| GB | 2408546 A | 6/2005 |
| GB | 2477745 A | 8/2011 |
| JP | 2003227497 A | 8/2003 |
| KR | 200930757 A | 3/2009 |
| KR | 1025867 B1 | 3/2011 |
| KR | 1387391 B1 | 4/2014 |
| WO | 2014098276 A1 | 6/2014 |
| WO | 2022229555 A2 | 11/2022 |

* cited by examiner

ADJUSTABLE FAN TRACK LINER WITH DUAL SLOTTED ARRAY ACTIVE FAN TIP TREATMENT FOR DISTORTION TOLERANCE

STATEMENT REGARDING FEDERALLY SPONSORED RESEARCH OR DEVELOPMENT

Embodiments of the present disclosure were made with government support under Contract No. FA8650-19-D-2063 or FA8650-19-F-2078. The government may have certain rights.

FIELD OF THE DISCLOSURE

The present disclosure relates generally to gas turbine engines, and more specifically to fan assemblies for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior. The fan of the gas turbine engine may include mitigation systems to reduce or minimize the negative effects of pressure and swirl distortions to improve stall margin of the engine.

SUMMARY

The present disclosure may comprise one or more of the following features and combinations thereof. A fan case assembly may be adapted for use with a gas turbine engine. The fan case assembly may include a case, a plurality of drums, and a control unit.

In some embodiments, the case that may extend circumferentially at least partway about a central axis of the fan case assembly to define an outer boundary of a gas path of the gas turbine engine. The case may be formed to define a plenum. The plenum may that extend circumferentially at least partway about the central axis.

In some embodiments, the plurality of drums may be arranged in the plenum and spaced circumferentially about the central axis. Each drum of the plurality of drums may be shaped to include a first slot and a second slot spaced apart axially along the drum that each extend through the corresponding drum. Each drum of the plurality of drums may be configured to rotate about a respective drum axis between a closed position, a first position, and a second position.

In some embodiments, in the closed position, the first slot and the second slot of the corresponding drum may both be closed off from the gas path to block fluid communication between the gas path and the plenum through either the first slot or the second slot. In the first open position, the first slot of the corresponding drum may be open to the gas path to allow fluid communication between the gas path and the plenum through the first slot while the second slot remains closed off from the gas path. In the second open position, the second slot of the corresponding drum may be open to the gas path to allow fluid communication between the gas path and the plenum through the second slot while the first slot remains closed off from the gas path.

In some embodiments, the control unit may be configured to rotate the plurality of drums about the respective drum axis between the closed position, the first open position, and the second open position. The control unit may rotate the plurality of drums between the positions in response to preselected operating conditions to minimize negative effects pressure and swirl distortions in the gas turbine engine to improve stall margin.

In some embodiments, the first slot may be disposed closer to a first axial end of the drum that the second slot. The second slot may be disposed closer to a second axial end of the drum than the first slot. The second axial end may be opposite from the first axial end.

In some embodiments, the first slot may be disposed closer to a leading edge of a fan blade that the second slot. The second slot may be disposed closer to a trailing edge of the fan blade than the first slot.

In some embodiments, the first slot may extend through the corresponding drum at a first angle relative to the gas path and the second slot may extend through the corresponding drum at a second angle relative to the gas path. The second angle may be different from the first angle.

In some embodiments, the plurality of drums may include a first set of drums and a second set of drums. The control unit may be configured to rotate the first set of drums between the closed position, the first open position, and the second open position independent of the second set of drums. In some embodiments, the first set of drums may be alternated circumferentially between the second set of drums.

In some embodiments, each drum of the plurality of drums may have a cylindrical shape that defines a first end, a second end spaced apart axially from the first end, and an outer surface that extends axially between the first end and the second end and circumferentially about the corresponding drum axis. The outer surface of each drum of the plurality of drums may cooperate with an inner surface of the gas path to define a portion of the outer boundary of the gas path when each drum of the plurality of drums is in the closed position to block fluid communication between the gas path and the plenum.

In some embodiments, each drum of the plurality of drums may have a cylindrical shape that defines a first end, a second end spaced apart axially from the first end, and an outer surface that extends axially between the first end and the second end and circumferentially about the corresponding drum axis. The outer surface of each drum of the plurality of drums may, at an axial position of the second slot, cooperate with an inner surface of the gas path to define a portion of the outer boundary of the gas path when each drum of the plurality of drums is in the first open position to block fluid communication between the gas path and the plenum at the second slot.

In some embodiments, each drum of the plurality of drums may have a cylindrical shape that defines a first end, a second end spaced apart axially from the first end, and an outer surface that extends axially between the first end and the second end and circumferentially about the corresponding drum axis. The outer surface of each drum of the plurality of drums may, at an axial position of the first slot, cooperate with an inner surface of the gas path to define a portion of the outer boundary of the gas path when each drum of the plurality of drums is in the second open position to block fluid communication between the gas path and the plenum at the first slot.

In some embodiments, the control unit may include at least one actuator coupled to the plurality of drums. The actuator may be configured to drive rotation of the plurality of drums between the closed position, the first open position, and the second open position. The control unit may include a controller coupled to the at least one actuator and configured to direct the at least one actuator to move the plurality of drums to the closed position when the gas turbine engine is in a cruise condition included in the preselected operating conditions.

In some embodiments, the control unit may further include a memory coupled to the controller. The memory may include a plurality of preprogrammed aircraft maneuvers that each correspond to one of the closed position, the first open position, and the second open position. The controller may be configured to detect a preprogrammed aircraft maneuver included in the plurality of preprogrammed aircraft maneuvers on the memory and direct the at least one actuator to move the plurality of drums to a corresponding position in response to detecting the preprogrammed aircraft maneuver.

In some embodiments, the control unit may further include at least one sensor coupled to the controller and configured to measure one of pressure, air speed, altitude, blade tip timing, blade rotational speed, attitude, and acceleration. The controller may be is configured to receive a measurement from the at least one sensor and direct the at least one actuator to move the plurality of drums to a corresponding position in response to the measurement of the at least one sensor.

According to another aspect of the present disclosure, the gas turbine engine may include a fan and a fan case assembly. The fan may include a fan rotor and a plurality of fan blades. The fan rotor may be configured to rotate about an axis of the gas turbine engine. The plurality of fan blades may be coupled to the fan rotor for rotation therewith.

In some embodiments, the fan case assembly may be adapted for use with the gas turbine engine. The fan case assembly may include a case, a plurality of drums, and a control unit.

In some embodiments, the case may extend circumferentially at least partway about a central axis of the fan case assembly. The case may define an outer boundary of a gas path of the gas turbine engine. The case may be formed to define a plenum that extends circumferentially at least partway about the central axis.

In some embodiments, the plurality of drums may be arranged in the plenum. Each drum of the plurality of drums may be shaped to include a first slot and a second slot spaced apart axially from the first slot that each extend through the corresponding drum. Each drum of the plurality of drums may be configured to rotate about a respective drum axis between a closed position and an open position.

In some embodiments, in the closed position, both the first slot and the second slot of the corresponding drum may be closed off from the gas path to block fluid communication between the gas path and the plenum through either the first slot or the second slot. In the open position, one of the first slot and the second slot of the corresponding drum may be open to the gas path to allow fluid communication between the gas path and the plenum through one of the first slot and the second slot while the other of the first slot and the second slot is closed off from the gas path.

In some embodiments, the control unit may be configured to rotate the plurality of drums about the respective drum axis between the closed position and the open position. In some embodiments, the control unit may be configured to rotate the plurality of drums about the respective drum axis between the closed position and the open position in response to preselected operating conditions.

In some embodiments, the first slot may be disposed closer to a first axial end of the drum that the second slot. The second slot may be disposed closer to a second axial end of the drum than the first slot. The second axial end may be opposite from the first axial end.

In some embodiments, each of the plurality of fan blades may include a leading edge and a trailing edge. The first slot may be located closer to the leading edge of the plurality of fan blades than the second slot. The second slot may be located closer to the trailing edge of the plurality of fan blades than the first slot.

In some embodiments, the first slot may extend through the corresponding drum at a first angle relative to the gas path. The second slot may extend through the corresponding drum at a second angle relative to the gas path. The second angle may be different from the first angle.

In some embodiments, the plurality of drums may include a first set of drums and a second set of drums. The control unit may be configured to rotate the first set of drums between the closed position and the open position. The control unit may be configured to rotate the first set of drums between the closed position and the open position independent of the second set of drums. In some embodiments, the first set of drums may be alternated circumferentially between the second set of drums.

In some embodiments, the control unit may include at least one actuator coupled to the plurality of drums. The control unit may be configured to drive movement of the plurality of drums between the closed position and the open position. The control unit may include a controller coupled to the at least one actuator. The controller may be configured to direct the at least one actuator to move the plurality of drums to the closed position when the gas turbine engine is in a cruise condition included in the preselected operating conditions.

According to another aspect of the present disclosure, a method may include providing a fan case assembly. The fan case assembly may be adapted for use with a gas turbine engine. The fan case assembly may include a case and a plurality of drums. The case may extend circumferentially at least partway about a central axis of the gas turbine engine. The case may define an outer boundary of a gas path of the gas turbine engine. The case may be formed to define a plenum that extends circumferentially at least partway about the central axis.

In some embodiments, each drum of the plurality of drums may be shaped to include a first slot and a second slot extending through the corresponding drum. Each drum of the plurality of drums may be configured to rotate about a respective drum axis.

In some embodiments, the method may include locating the plurality of drums in a closed position. In the closed position, both the first slot and the second slot of the corresponding drum may be closed off from the gas path to block fluid communication between the gas path and the plenum through either the first slot or the second slot.

In some embodiments, the method may include rotating the plurality of drums to an open position. In the open position, one of the first slot and the second slot of the corresponding drum may be open to the gas path to allow fluid communication between the gas path and the plenum through one of the first slot and the second slot while the other of the first slot and the second slot is closed off from the gas path.

These and other features of the present disclosure will become more apparent from the following description of the illustrative embodiments.

DETAILED DESCRIPTION OF THE DRAWINGS

Figure 1:
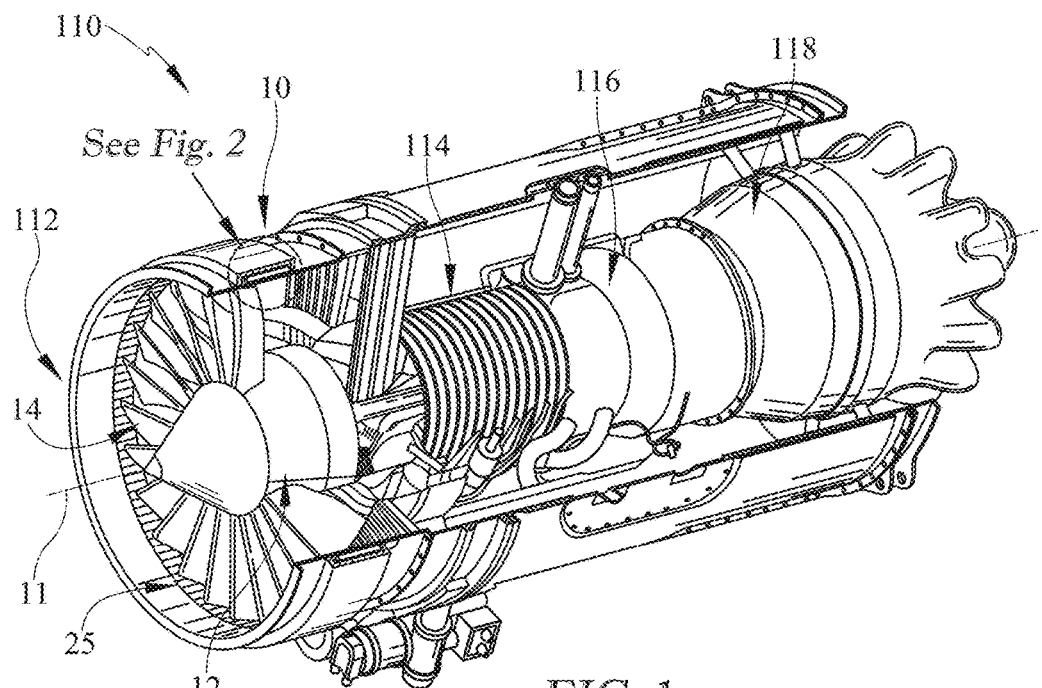
FIG. 1 is a cutaway view of a gas turbine engine that includes a fan, a compressor, a combustor, and a turbine, the fan including fan rotor configured to rotate about an axis of the engine and a fan case assembly that surrounds fan blades included in the fan rotor.

For the purposes of promoting an understanding of the principles of the disclosure, reference will now be made to a number of illustrative embodiments illustrated in the drawings and specific language will be used to describe the same.

A fan case assembly 10 is adapted for use in a gas turbine engine 110 as shown in FIG. 1. The gas turbine engine 110 includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about a central axis 11 of the gas turbine engine 110 and drive the compressor 114 and the fan 112.

The fan 112 includes a fan rotor 12 and a fan case assembly 10 as shown in FIG. 1. The fan rotor 12 has a number of fan blades 14. The fan case assembly 10 extends circumferentially around the fan blades 14 of the fan rotor 12 such that the fan case assembly 10 is aligned axially with the fan blades 14.

Figure 2:
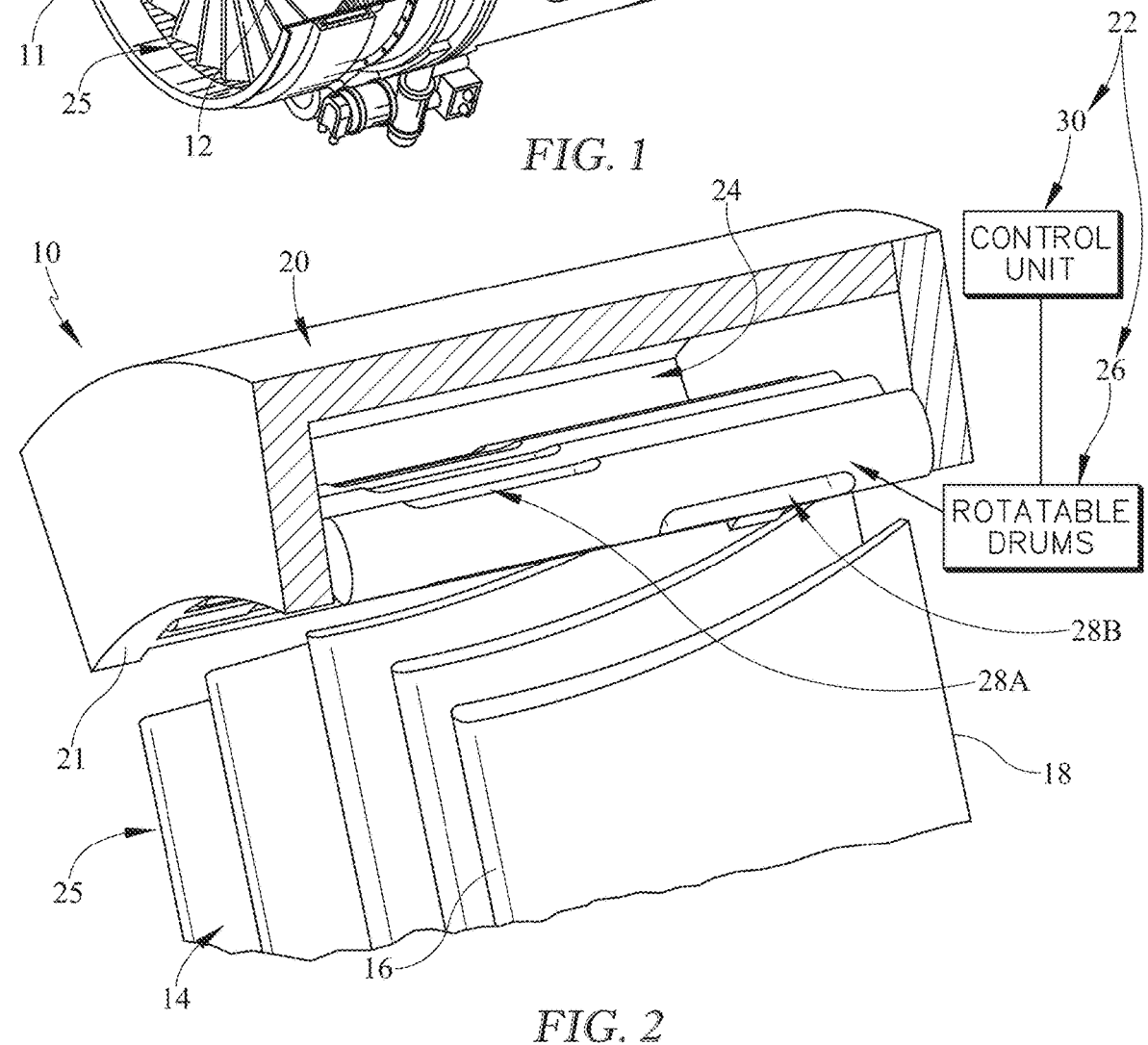
FIG. 2 is a detail view of the fan case assembly included in the gas turbine engine of FIG. 1 showing that the fan case assembly includes a case that extends circumferentially at least partway about a central axis of the engine radially outward of the fan blades to define an outer boundary of a gas path of the gas turbine engine, a plurality of drums arranged in the plenum and configured to rotate about a respective drum axis between a closed position as shown in FIGS. 8A and 8B, one of the open positions as shown in FIGS. 9A, 9B, 10A, and 10B, to control fluid communication between the gas path and the plenum through slots formed in the plurality of drums, and a control unit configured to rotate the plurality of drums between the different positions in response to preselected operating conditions to minimize negative effects of pressure and swirl distortions in the gas turbine engine to improve stall margin.
Figure 3:
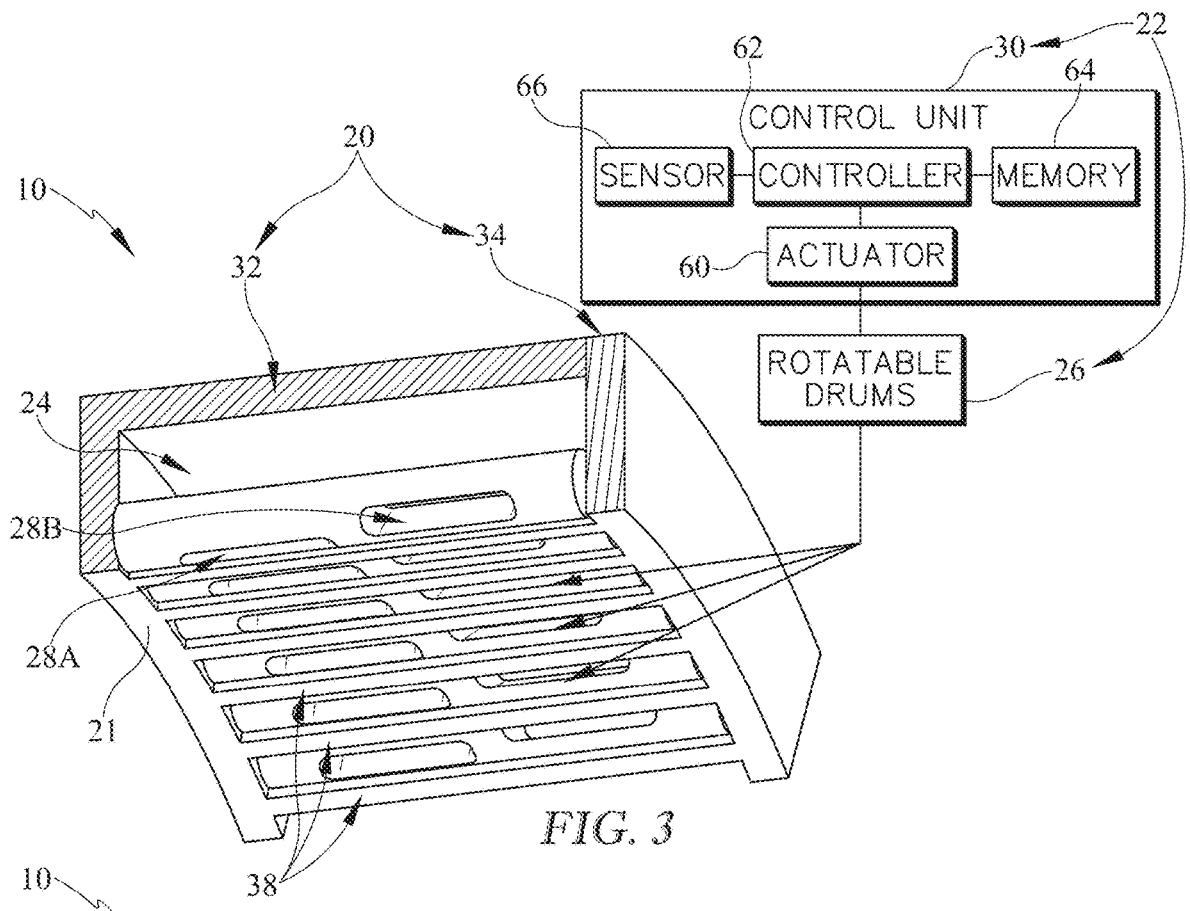
FIG. 3 is a perspective view of the fan case assembly of FIG. 2 showing the plurality of drums are spaced apart circumferentially about the central axis.
Figure 4:
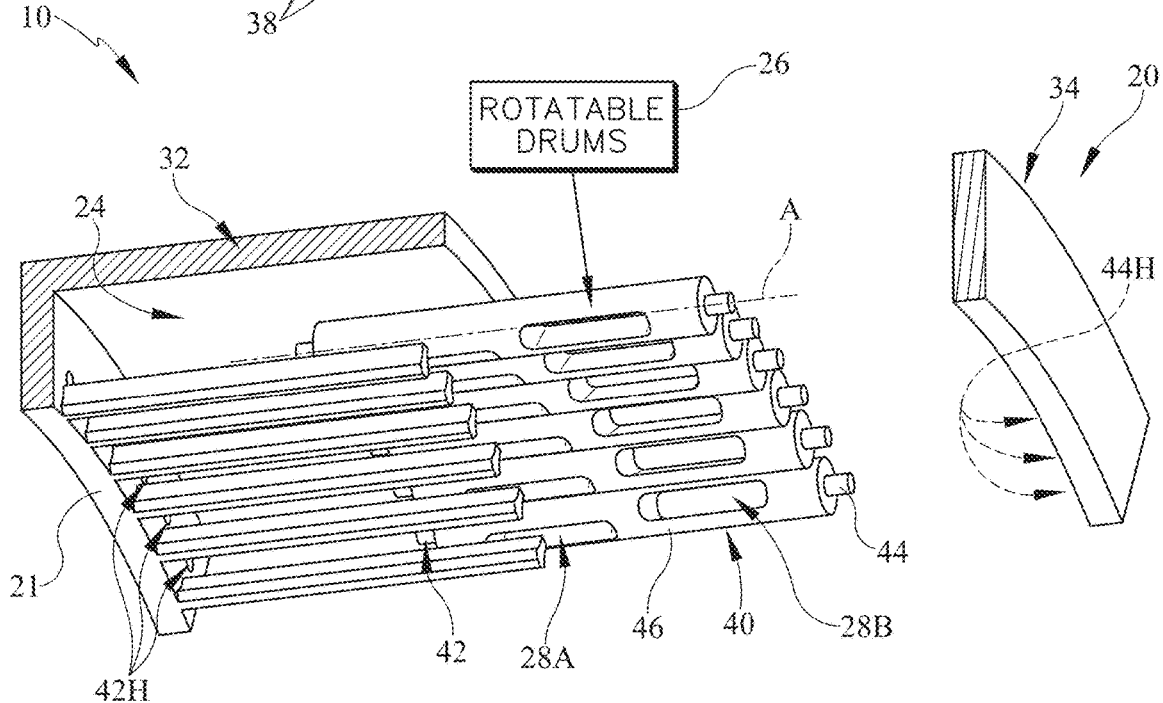
FIG. 4 is an exploded view of FIG. 3 showing the case includes a forward section and an aft section configured to be coupled to the forward section to trap the plurality of drums axially therebetween in the plenum, and further showing each of the drums includes a drum body that extends axially between opposite axial ends and a pair of pegs that extend axially from the opposite ends of the corresponding drum body to fit into peg holes formed in the forward and aft sections of the case.

The fan case assembly 10 includes, among other components, a case 20 and an inlet distortion mitigation system 22 as shown in FIGS. 2-4. The case 20 extends circumferentially at least partway about the central axis 11 to define an outer boundary of a gas path 25 of the gas turbine engine 110. The case 20 is formed to define a plenum 24 that extends circumferentially at least partway about the central axis 11 and is open to the gas path 25 of the gas turbine engine 110. The inlet distortion mitigation system 22 is configured to control fluid communication between the plenum 24 and the gas path 25 of the gas turbine engine 110.

The inlet distortion mitigation system 22 includes a plurality of rotatable drums 26 and a control unit 30 as shown in FIGS. 2-4. The plurality of drums 26 are rotatably coupled to the case 20 in the plenum 24 to rotate about a drum axis A. Each drum 26 of the plurality of drums 26 includes a leading edge slot 28A and a trailing edge slot 28B. Each of the slots 28A, 28B extend completely through the corresponding drum 26 to allow airflow through the corresponding drum 26. The slots 28A, 28B extend axially partway along the drums 26 relative to the drum axis A. The leading edge slot 28A is closer in proximity to a leading edge 16 of the fan blades 14 and the trailing edge slot 28B is closer in proximity to a trailing edge 18 of the fan blades.

In illustrative embodiments, the leading edge slot 28A extends axially between an end of the corresponding drum 26 closest to the leading edge 16 of the fan blades 14 and an axially midpoint of the drum 26. In illustrative embodiments, the trailing edge slot 28B extends axially between an end of the corresponding drum 26 closest to the trailing edge 18 of the fan blades 14 and the axially midpoint of the drum 26. In other illustrative embodiments, the leading edge slot 28A or the trailing edge slot 28B may extend from one end of the corresponding drum 26 past the axial midpoint of the drum 26. In illustrative embodiments, the leading edge slot 28A and the trailing edge slot 28B are the same or substantially the same in axial length. In other illustrative embodiments, the leading edge slot 28A and the trailing edge slot 28B are different lengths.

Figure 8A:
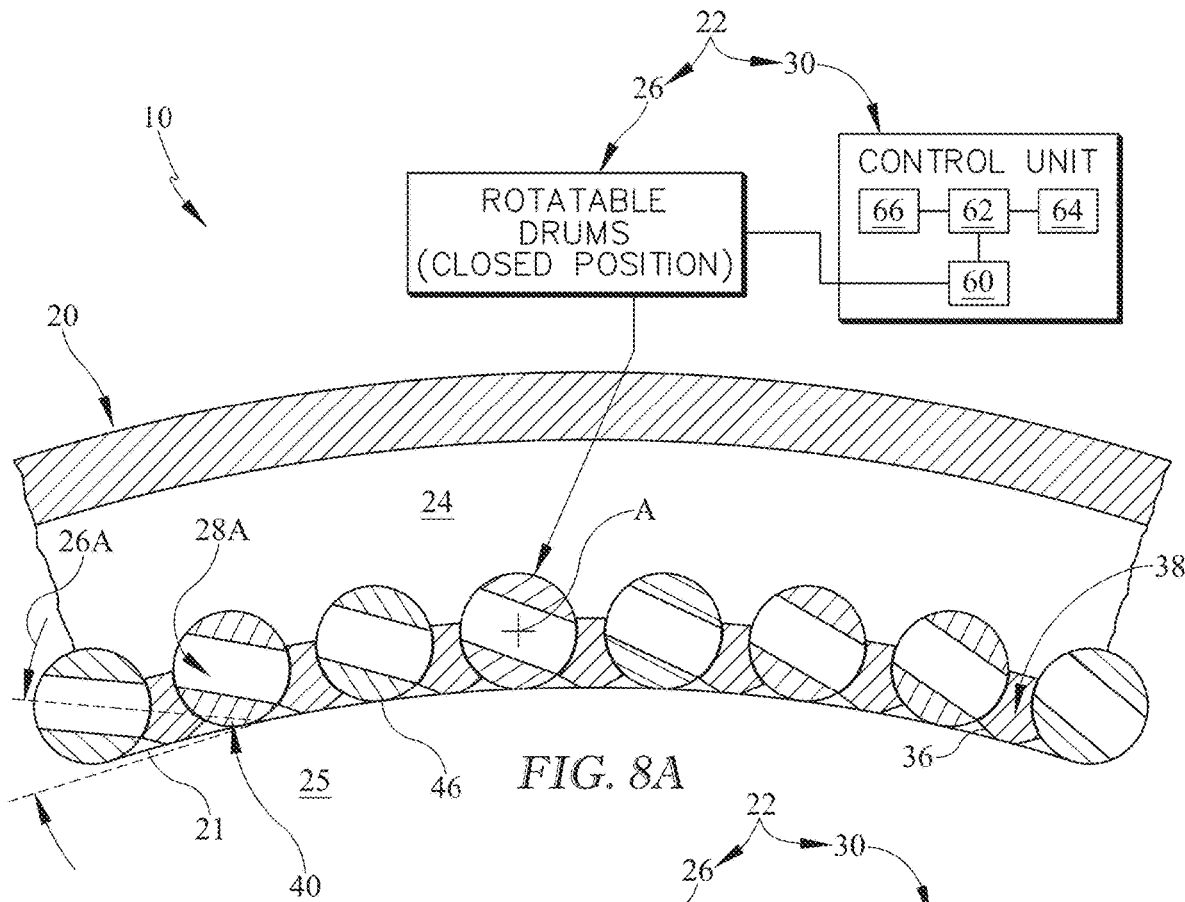
FIG. 8A is an axial cross-section view at the leading edge slots of fan case assembly of FIG. 3 with the plurality of drums in the closed position in which the leading edge slot of the corresponding drum is closed off from the gas path so that an outer surface of the corresponding drum near the leading edge cooperates with an inner surface of the case to define a portion of the outer boundary and block fluid communication between the gas path and the plenum through the leading edge slot.
Figure 8B:
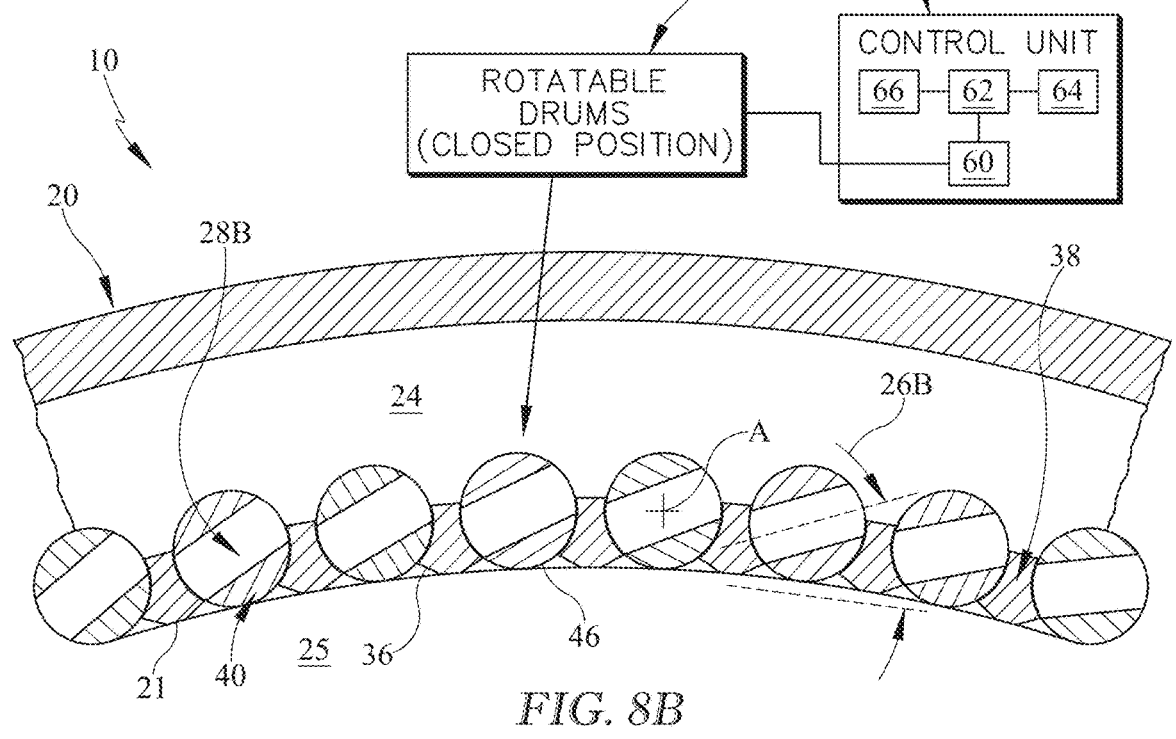
FIG. 8B is an axial cross-section view at the trailing edge slots of fan case assembly of FIG. 3 with the plurality of drums in the closed position in which the trailing edge slot of the corresponding drum is closed off from the gas path so that an outer surface of the corresponding drum near the trailing edge cooperates with an inner surface of the case to define a portion of the outer boundary and block fluid communication between the gas path and the plenum through the trailing edge slot.
Figure 9A:
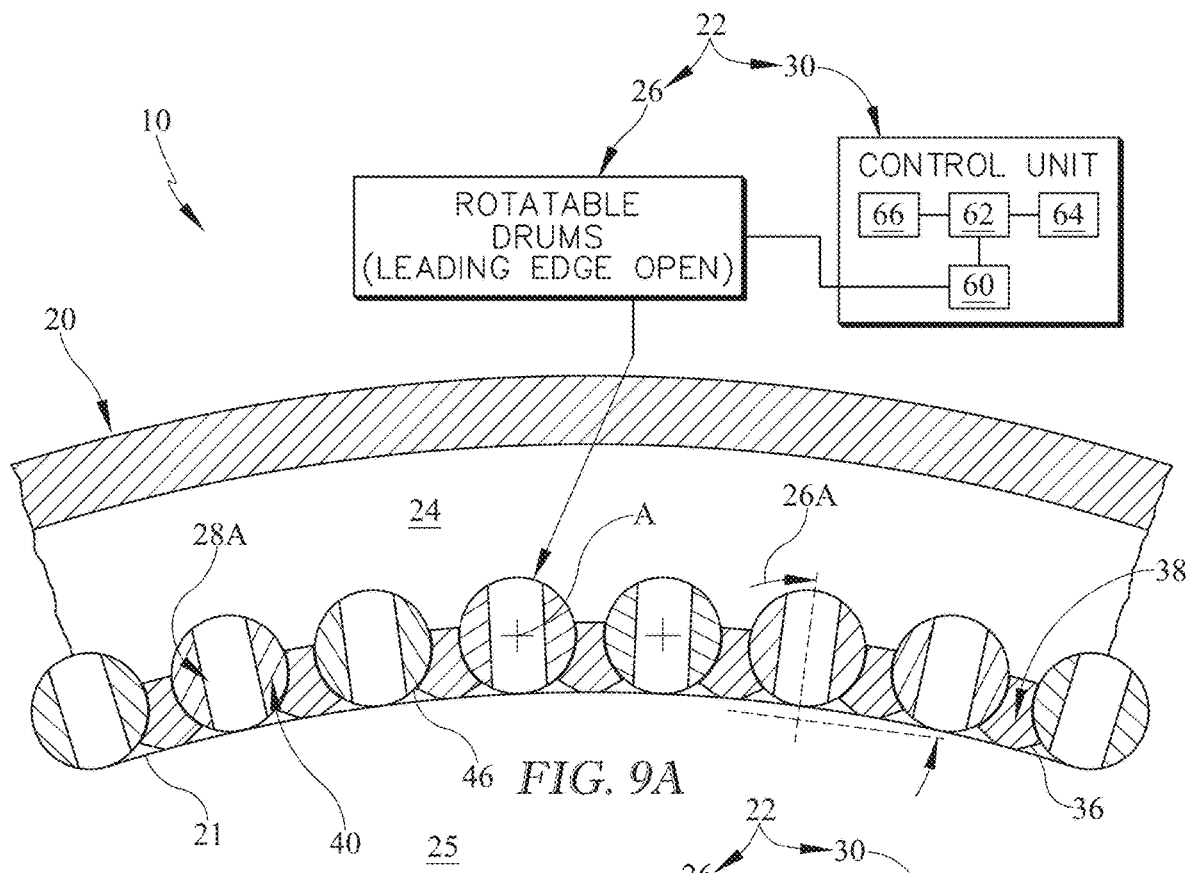
FIG. 9A is an axial cross-section view at the leading edge slots of fan case assembly of FIG. 3 with the plurality of drums in the leading edge open position in which the leading edge slot of the corresponding drum extends axially relative to the central axis to open the leading edge slot to the gas path to allow fluid communication between the gas path and the plenum through the leading edge slot near the leading edge of the drum.
Figure 9B:
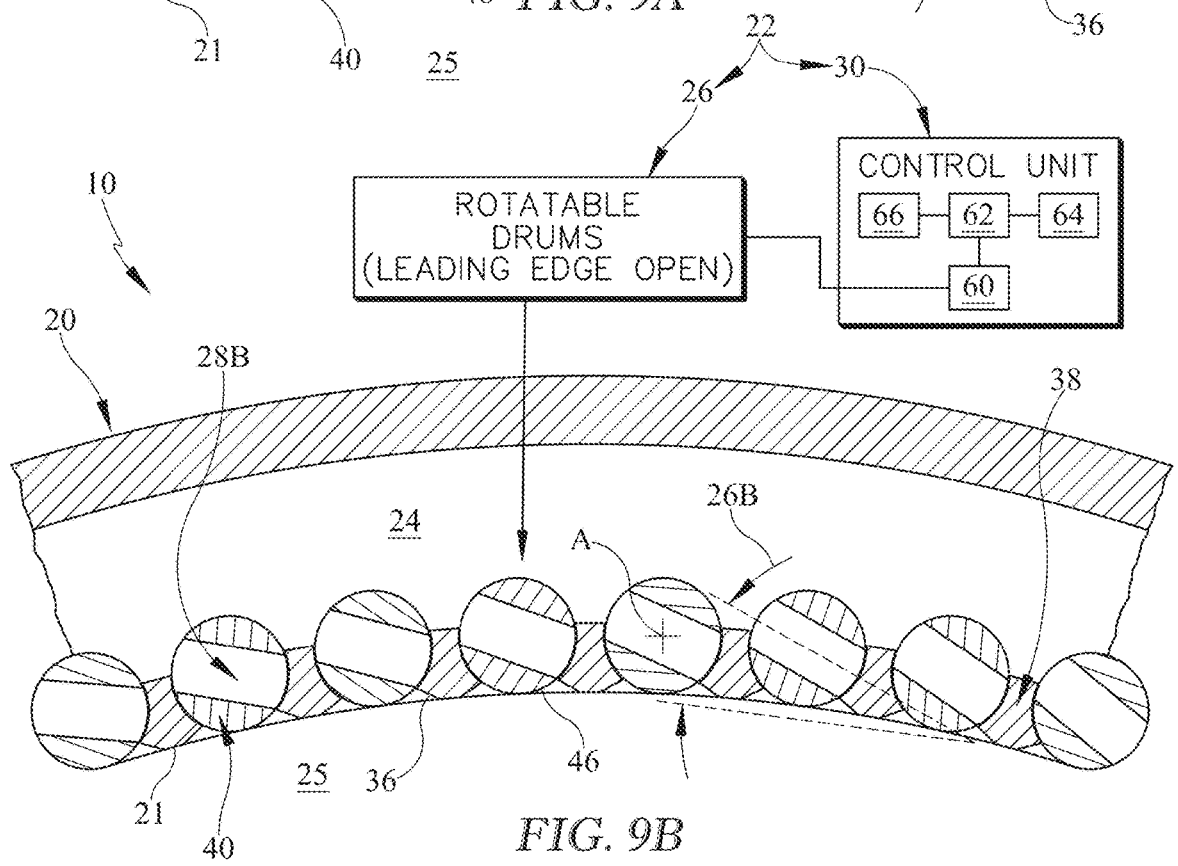
FIG. 9B is an axial cross-section view at the trailing edge slots of fan case assembly of FIG. 3 with the plurality of drums in the leading edge open position in which the trailing edge slot of the corresponding drum is closed off from the gas path to block fluid communication between the gas path and the plenum through the trailing edge slot.
Figure 10A:
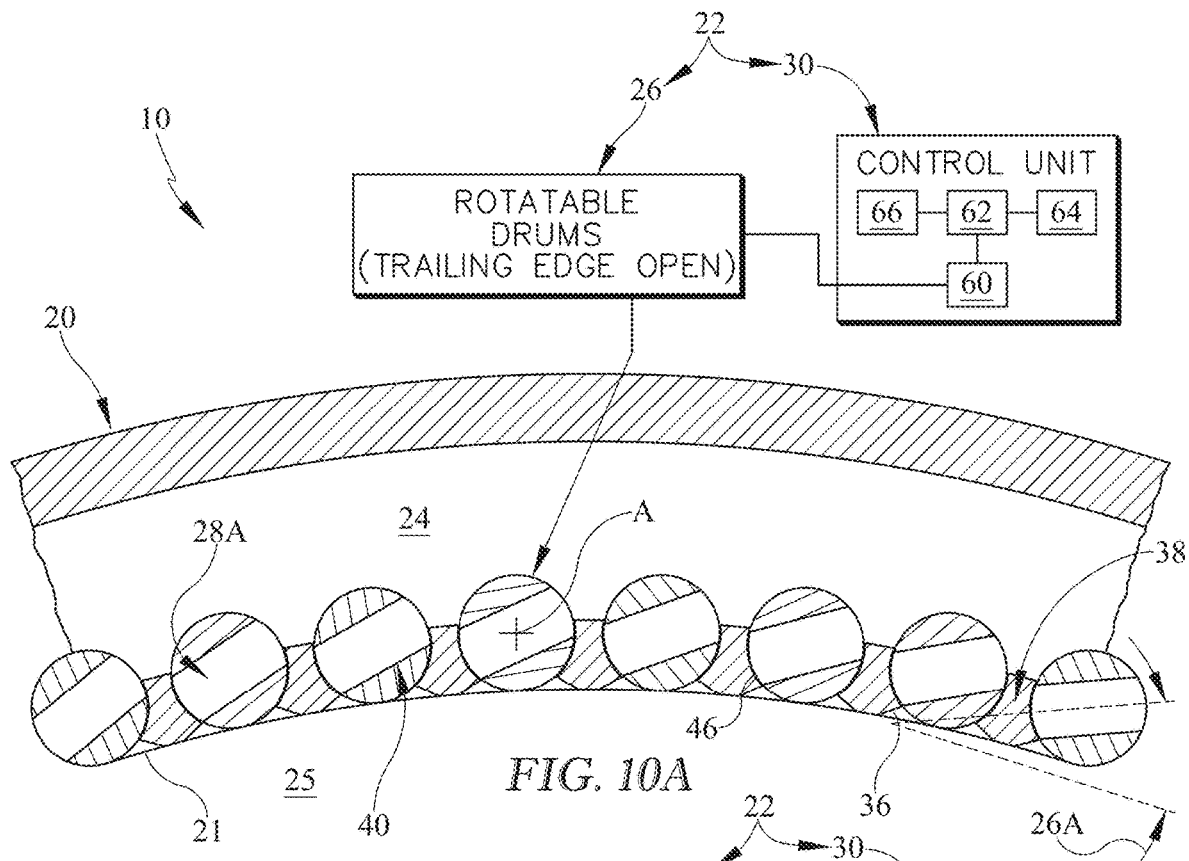
FIG. 10A is an axial cross-section view at the leading edge slots of fan case assembly of FIG. 3 with the plurality of drums in the trailing edge open position in which the leading edge slot of the corresponding drum is closed off from the gas path to block fluid communication between the gas path and the plenum through the leading edge slot.
Figure 10B:
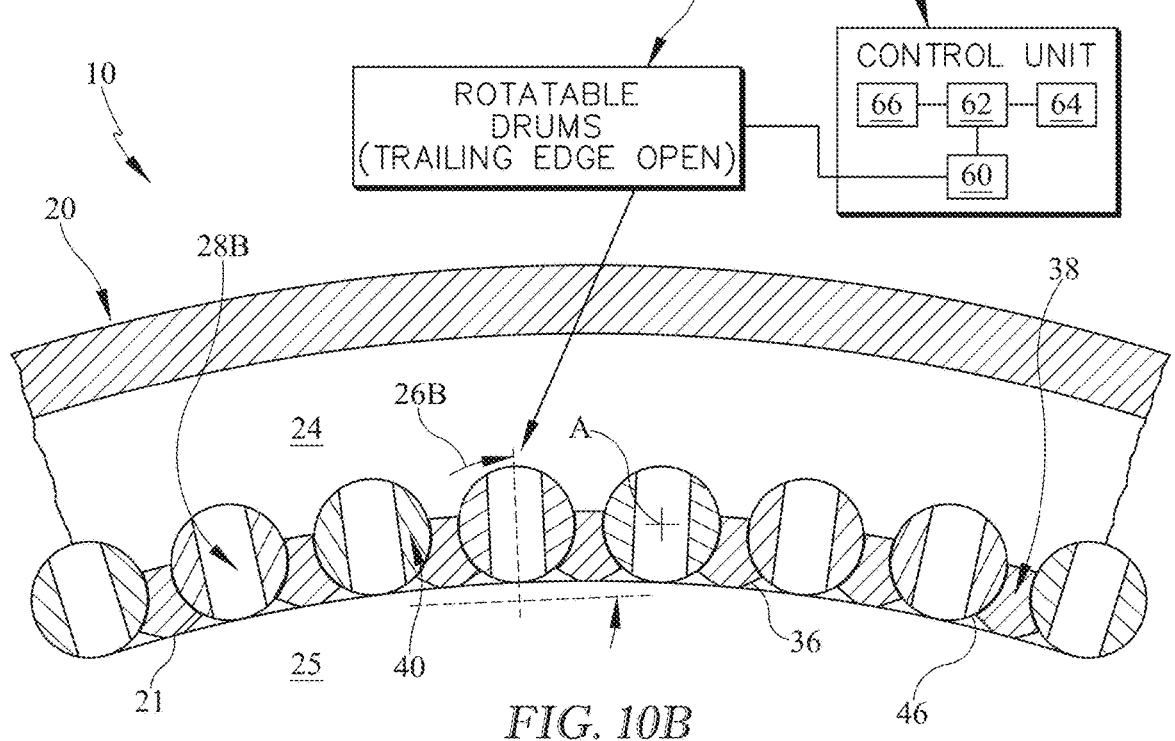
FIG. 10B is an axial cross-section view at the trailing edge slots of fan case assembly of FIG. 3 with the plurality of drums in the trailing edge open position in which the trailing edge slot of the corresponding drum extends axially relative to the central axis to open the trailing edge slot to the gas path to allow fluid communication between the gas path and the plenum through the trailing edge slot near the trailing edge of the drum.

The inlet distortion mitigation system 22 is configured to change between a closed mode as shown in FIGS. 8A and 8B, a leading edge open mode as shown in FIGS. 9A and 9B, and a trailing edge open mode as shown in FIGS. 10A and 10B. In the closed mode, all of the drums 26 are in a closed position so that both of the corresponding slots 28A, 28B face away from the gas path 25 to prevent fluid communication with the slots 28A, 28B of the corresponding drums 26. In the leading edge open mode, some or all of the drums 26 are in the leading edge open position so that the corresponding leading edge slot 28A faces toward the gas path 25 to open the leading edge slot 28A to the gas path 25 and allow fluid communication therewith, but the trailing edge slot 28B is closed off from the gas path. In the trailing edge open mode, some or all of the drums 26 are in the trailing edge open position so that the corresponding trailing edge slot 28B faces toward the gas path 25 to open the trailing edge slot 28B to the gas path 25 and allow fluid communication therewith, but the leading edge slot 28B is closed off from the gas path. In the closed mode, no tip treatment benefit is provided, while in the leading edge open mode or trailing edge open mode, the tip treatment is applied to the fan blades 14.

Figure 5:
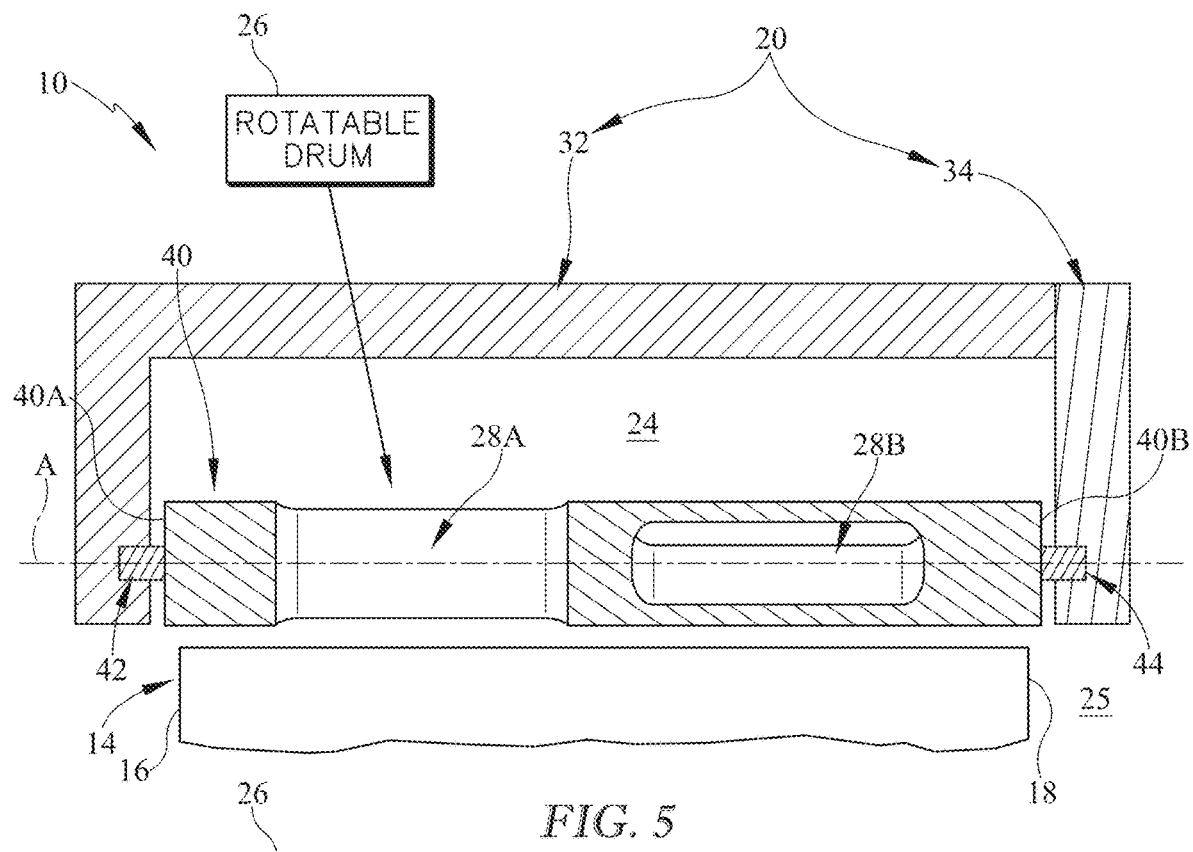
FIG. 5 is a circumferential cross-section view of the fan case assembly of FIG. 3 with the plurality of drums in the leading edge open position in which the leading edge slot of the corresponding drum extends radially relative to the central axis to open the leading edge slot to the gas path to allow fluid communication between the gas path and the plenum through the leading edge slot near the leading edge of the drum.
Figure 6:
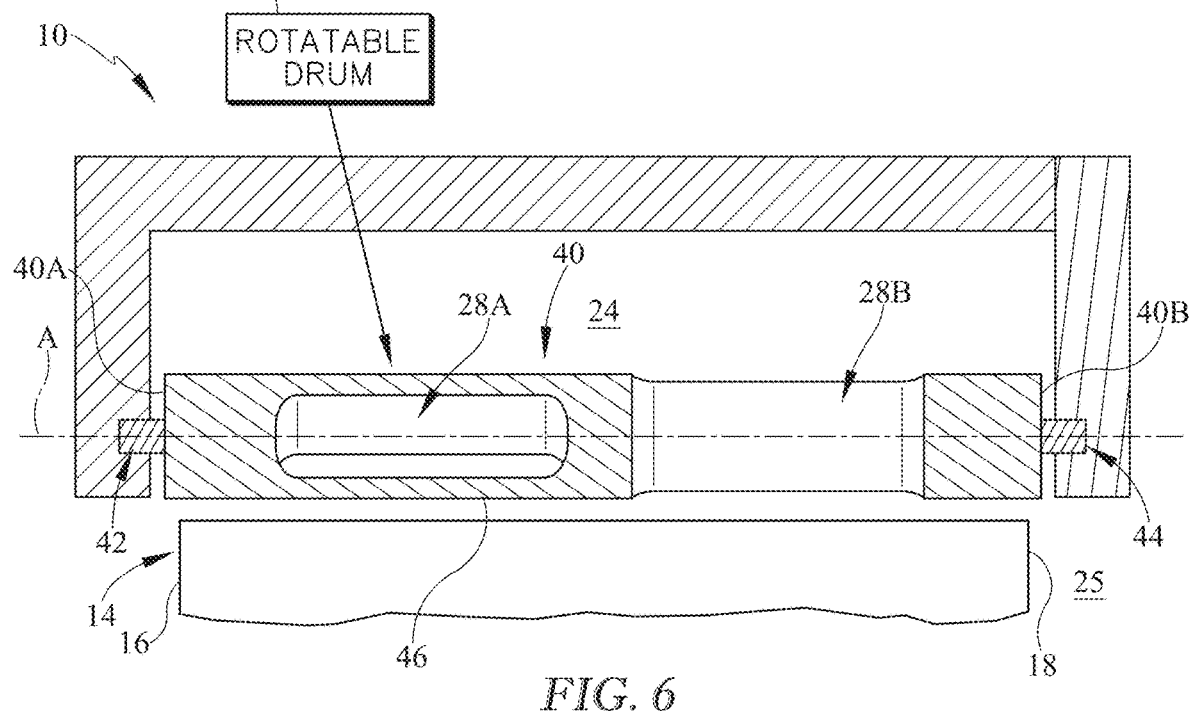
FIG. 6 is a circumferential cross-section view of the fan case assembly of FIG. 3 with the plurality of drums in the trailing edge open position in which the trailing edge slot of the corresponding drum extends radially relative to the central axis to open the trailing edge slot from the gas path to allow fluid communication between the gas path and the plenum through the trailing edge slot near the trailing edge of the drum.
Figure 7:
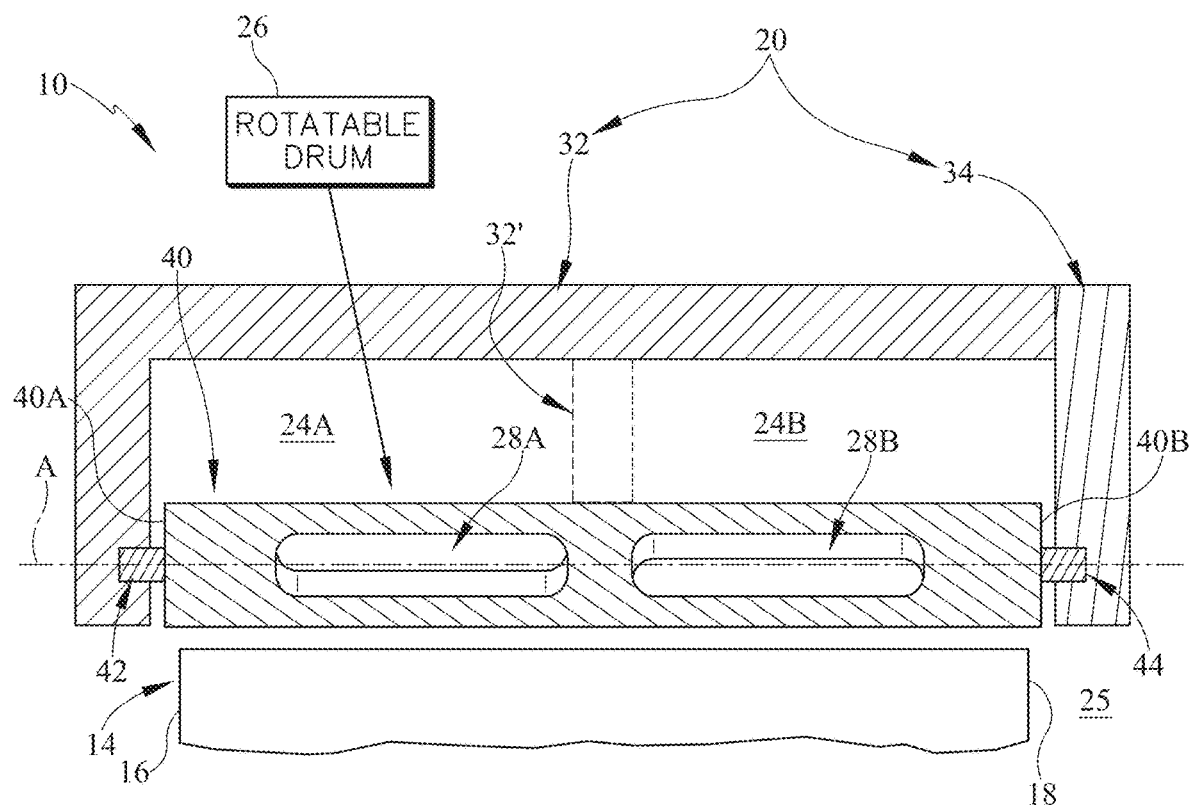
FIG. 7 is a circumferential cross-section view of the fan case assembly of FIG. 3 with the plurality of drums in the closed position in which both the leading edge slot and the trailing edge slot of the corresponding drum are closed off from the gas path to block fluid communication between the gas path and the plenum through both the trailing edge slot and the leading edge slot.

The plurality of drums 26 are each configured to rotate between a closed position as shown in FIGS. 7, 8A, and 8B, a leading edge open position as shown in FIGS. 5, 9A, and 9B, and trailing edge open position as shown in FIGS. 6, 10A, and 10B. The control unit 30 is configured to rotate each of the plurality of drums 26 about the corresponding drum axis A between the different positions in response to preselected operating conditions to control fluid communication between the plenum 24 and the gas path 25 so as to minimize the negative effects of pressure and swirl distortions in the gas turbine engine 110 to improve stall margin for the gas turbine engine 110.

Embedded engines on an aircraft may experience high distortion in the form of pressure gradients and swirl. The pressure and swirl distortions may cause engine stall or other undesirable aeromechanical behavior. Additionally, there may be points during a mission or moments with maneuvers where it may be desirable to incorporate a different available stall margin or to be able to more evenly distribute flows. Attempting to solve the worst stall condition while maintaining performance over all of the cycles or flight conditions may be difficult and result in compromised efficiency or a limited flight envelope.

Therefore, the fan case assembly 10 includes the inlet distortion mitigation system 22 which includes the plurality of drums 26 that rotate relative to the case 20 to control fluid communication between the plenum 24 and the gas path 25. In this way, the negative effects of pressure and swirl distortions are minimized to improve stall margin. Compensating for distortion to maintain operability margin may further negatively affect efficiency or performance. The negative effects may include loss of efficiency or overall performance of the engine 110 and/or other negative operating conditions known to one of ordinary skill in the art.

In the closed position, both the leading edge slot 28A and the trailing edge slot 28B of each corresponding closed drum 26 is closed off from the gas path 25 to block fluid communication between the gas path 25 and the plenum 24 through the leading edge slot 28A, as shown in FIG. 8A, and through the trailing edge slot 28B, as shown in FIG. 8B. In other words, in the closed position, a portion of the outer surface 46 of each of the closed drums 26, at an axial location of both the leading edge slot 28A and the trailing edge slot 28B, cooperates with an inner surface 21 of the case 20 to define the outer boundary of the gas path 25. The outer surface 46 of each drum 26 forms a part of the outer boundary of the gas path 25 thereby covering any opening of the plenum 24 near both the leading edge 16 and the trailing edge 18 of the fan blades 14 to block fluid communication between the gas path 25 and the plenum 24 when each of the drums 26 are in the closed position.

A slot 28A, 28B of the corresponding drums 26 faces away from the gas path 25 whenever the slot 28A, 28B is closed off from or not open to the gas path 25 so that fluid communication between the gas path 25 and the slot 28A, 28B is blocked. As shown in FIGS. 8A, 8B, 9B, and 10A, the slots 28A, 28B face away from gas path 25 by extending radially and circumferentially relative to the axis 11. In some embodiments, the slot 28A, 28B may extend radially and circumferentially at different angles relative to the axis 11 than those shown in FIGS. 8A, 8B, 9B, and 10A, but still remain facing away from the gas path 25 as the slot 28A, 28B are still blocked from fluid communication with the gas path 25.

A slot 28A, 28B of the corresponding drums 26 faces towards the gas path 25 whenever the slot 28A, 28B is open to the gas path 25 so that fluid communication between the gas path 25 and the slot 28A, 28B is allowed. As shown in FIGS. 9A and 10B, the slots 28A and 28B, respectively face radially inward toward the gas path 25. In some embodiments, the slot 28A, 28B may extend radially and circumferentially relative to the axis 11, but still remain facing toward the gas path 25 as the slot 28A, 28B are still in fluid communication with the gas path 25.

FIGS. 8A and 8B show the drums 26 at the same, closed position. FIG. 8A shows a cross-section view at the leading edge slot 28A of the drums 26 in the closed position, and FIG. 8B shows a cross-section view at the trailing edge slot 28B of the drums 26 in the same, closed position. In other words, FIG. 8A and FIG. 8B show the same drums 26 in the same closed position, but FIG. 8A shows an axial cross section at a first location along an axis A of the drums 26, and FIG. 8B shows an axial cross section at a second location along the axis A of the drums, axially aft of the first location shown in FIG. 8A.

In the leading edge open position, the leading edge slot 28A of each corresponding drum 26 extends radially relative to the central axis 11 to open the leading edge slot 28A to the gas path 25 to allow fluid communication between the gas path 25 and the plenum 24 through the leading edge slot 28A as shown in FIGS. 5 and 9A. In other words, in the leading edge open position, the leading edge slot 28A extends perpendicular to or at a 90° angle to the inner surface 21 of the case 20. Allowing fluid communication between the gas path 25 and the plenum 24 permits air pressure and flows to better equalize circumferentially about the fan 112 to improve stall margin.

Additionally, in the leading edge open position, the trailing edge slot 28B of each corresponding closed drum 26 is closed off from the gas path 25 to block fluid communication between the gas path 25 and the plenum 24 through the trailing edge slot 28B, as shown in FIGS. 5 and 9B. In other words, in the leading edge open position, a portion of the outer surface 46 of each of the closed drums 26 at an axial location of the trailing edge slot 28B cooperates with an inner surface 21 of the case 20 to define the outer boundary of the gas path 25. The outer surface 46 of each drum 26 at an axial location of the trailing edge slot 28B forms a part of the outer boundary of the gas path 25 thereby covering any opening of the plenum 24 near the trailing edge 18 of the fan blades 14 to block fluid communication between the gas path 25 and the plenum 24 near the trailing edge 18 of the fan blades 14 when each of the drums 26 are in the leading edge open position.

FIGS. 9A and 9B show the drums 26 at the same, leading edge open position. FIG. 9A shows a cross-section view at the leading edge slot 28A of the drums 26 in the leading edge open position, and FIG. 9B shows a cross-section view at the trailing edge slot 28B of the drums 26 in the same, leading edge open position. In other words, FIG. 9A and FIG. 9B show the same drums 26 in the same leading edge open position, but FIG. 9A shows an axial cross section at a first location along an axis A of the drums 26, and FIG. 9B shows an axial cross section at a second location along the axis A of the drums, axially aft of the first location shown in FIG. 9A.

In the trailing edge open position, the trailing edge slot 28B of each corresponding drum 26 extends radially relative to the central axis 11 to open the trailing edge slot 28B to the gas path 25 to allow fluid communication between the gas path 25 and the plenum 24 through the trailing edge slot 28B as shown in FIGS. 6 and 10B. In other words, in the trailing edge open position, the trailing edge slot 28B extends perpendicular to or at a 90° angle to the inner surface 21 of the case 20. Allowing fluid communication between the gas path 25 and the plenum 24 permits air pressure and flows to better equalize circumferentially about the fan 112 to improve stall margin.

Additionally, in the trailing edge open position, the leading edge slot 28A of each corresponding closed drum 26 is closed off from the gas path 25 to block fluid communication between the gas path 25 and the plenum 24 through the leading edge slot 28A, as shown in FIGS. 6 and 10A. In other words, in the trailing edge open position, a portion of the outer surface 46 of each of the closed drums 26 at an axial location of the leading edge slot 28A cooperates with an inner surface 21 of the case 20 to define the outer boundary of the gas path 25. The outer surface 46 of each drum 26 at an axial location of the leading edge slot 28A forms a part of the outer boundary of the gas path 25 thereby covering any opening of the plenum 24 near the leading edge 16 of the fan blades 14 to block fluid communication between the gas path 25 and the plenum 24 near the leading edge 16 of the fan blades 14 when each of the drums 26 are in the trailing edge open position.

FIGS. 10A and 10B show the drums 26 at the same, trailing edge open position. FIG. 10A shows a cross-section view at the leading edge slot 28A of the drums 26 in the trailing edge open position, and FIG. 10B shows a cross-section view at the trailing edge slot 28B of the drums 26 in the same, trailing edge open position. In other words, FIG. 10A and FIG. 10B show the same drums 26 in the same trailing edge open position, but FIG. 10A shows an axial cross section at a first location along an axis A of the drums 26, and FIG. 10B shows an axial cross section at a second location along the axis A of the drums, axially aft of the first location shown in FIG. 10A.

In other illustrative embodiments, a plurality of intermediate positions are between the closed position, the leading edge open position, and the trailing edge open position. In any one of the open positions, the leading edge slot 28A and/or the trailing edge slot 28B of each drum 26 may extend at an intermediate angle relative to the gas path 25. In other words, in one of the intermediate positions, the leading edge slot 28A and/or the trailing edge slot 28B of each drum 26 may be angled such that the slot 28A, 28B extends radially and circumferentially relative to the central axis 11. The intermediate angle is between the angle of the slot 28A, 28B when it is in the closed position, closed off from the gas path, and the angle of the slot 28A, 28B when it is in the respective open position and extending radially relative the central axis 11, perpendicular to the inner surface 21 of the case 20. In the intermediate positions, the slot 28A, 28B may be partially blocked by a portion of the case 20 so as to vary the fluid communication between the gas path 25 and the plenum 24. In other illustrative embodiments, based on the relative angle between the leading edge slot 28A and the trailing edge slot 28B, the leading edge slot 28A may be at an intermediate position when in the trailing edge open position and/or the trailing edge slot 28B may be at an intermediate position when in the leading edge open position.

The control unit 30 is configured to rotate the drums 26 between the different positions in response to preselected operating conditions. The preselected operating conditions include a plurality of preprogrammed aircraft maneuvers stored on a memory 64 included in the control unit 30. The plurality of preprogrammed aircraft maneuvers include banks, turns, rolls, etc.

The control unit 30 is configured to detect a preprogrammed aircraft maneuver included in the plurality of preprogrammed aircraft maneuvers on the memory 64. Once the preprogrammed aircraft maneuver is detected, the control unit 30 directs each of the drums 26 to rotate to a corresponding position in response to detecting the preprogrammed aircraft maneuver.

For example, the plurality of drums 26 may normally be in the closed position during a cruise condition so that no additional stall margin is created, but performance is not compromised. The cruise condition included in the preselected operating conditions corresponds to when the aircraft is in the cruise portion of the flight cycle.

Then, when the control unit 30 detects a preprogrammed aircraft maneuver, i.e. banks, turns, rolls, the control unit 30 directs the drums 26 to rotate to one of the leading edge open position or to the trailing edge open position so that flow is permitted through the slots 28A, 28B and into the plenum 24. This permits air pressure and flows to better equalize circumferentially around the fan 112 thereby minimizing the negative effects of pressure and swirl distortions to improve stall margin.

The control unit 30 is configured to direct some or all of the drums 26 to rotate from the closed position to one of the leading edge open position or to the trailing edge open position based on the detected preprogrammed aircraft maneuver. Depending on the preprogrammed aircraft maneuver, the control unit 30 may direct only certain drums 26 to move to one of the leading edge open position or to the trailing edge open position, while keeping others in the closed position. Additionally, the control unit 30 may direct some of the drums 26 to remain in the closed position, while directing some of the drums 26 to rotate to the leading edge opened position and/or others to the trailing edge open position. In other words, the control unit 30 is configured to individual vary the angle of the slots 28A, 28B or position of each of the drums 26.

The preselected operating conditions may further include a sensor input from at least one sensor 66 included in the control unit 30. The sensor 66 is configured to measure one of pressure, air speed, altitude, blade tip timing, blade rotational speed, attitude or aircraft orientation, and acceleration. In some embodiments, the control unit 30 includes a plurality of sensors 66 each configured to measure one of pressure, air speed, and acceleration.

In illustrative embodiments, the sensor 66 may be configured to measure pressure in the plenum 24. The plenum 24 pressure measurement may be used to determine when to shut off the drums 26, or place some or all of the drums 26 in the closed position. For example, the sensor 66 reading may be used to determine when to direct the drums 26 from, for example, from all drums 26 being 100% open to, for example, only 50% of the drums 26 being open. In illustrative embodiments, a Kulite, for example, a subminiature Kulite, or a static tap in the plenum 24 may be combined with a threaded Kulite dynamic pressure transducer, a flat pack transducer (such as, for example, a Endevco Model 8515C-15), or a short total pressure rake on the case 20 or in an inlet of the fan 112 and utilized to determine needed activation and deactivation of the drums 26. Additionally or alternatively, other combinations of static pressure measurement devices with dynamic pressure measurement devices may be used.

The control unit 30 is configured to receive a measurement from the at least one sensor 66 or sensors 66 and direct the drums 26 to rotate to a corresponding position in response to the measurement of the at least one sensor 66. The control unit 30 may be configured to rotate the drums 26 to be in the closed position when the measurements from the sensor 66 are within a predetermined threshold.

Then, when the measurement from the sensor 66 is outside of the predetermined threshold, the control unit 30 directs the drums 26 to rotate to one of the leading edge open position or to the trailing edge open position. Based on the difference of the measurement from the sensor 66 compared to the predetermined threshold, the control unit 30 may vary the position of the drums 26 to control the amount of fluid communication between the gas path 25 and the plenum 24 through the openings of the slots 28A, 28B of the drums 26.

The control unit 30 is configured to direct some or all of the drums 26 to rotate from the closed position to one of the leading edge open position or to the trailing edge open position based on the measurement from the sensor 66. The control unit 30 may direct some of the drums 26 to remain in the closed position, while directing some of the drums 26 to rotate to the leading edge opened position and/or others to the trailing edge open position based on the measurement from the sensor 66.

In some embodiments, the control unit 30 may be configured to use a combination of the sensor measurements and the detected preprogrammed aircraft maneuver to control the position of the plurality of drums 26. For example, when the control unit 30 detects a preprogrammed aircraft maneuver and the measurement is outside of the predetermined threshold, the control unit 30 directs some or all of the drums 26 to rotate to one of the leading edge open position or to the trailing edge open position. The control unit 30 is configured to direct some of the drums 26 to rotate to the leading edge open position while others are rotated to the trailing edge open position. The control unit 30 is configured to individual vary the angle of the slots 28A, 28B of each of the drums 26.

In some embodiments, the control unit 30 is configured to use the measurements from the sensor 66 to anticipate the aircraft maneuver. The control unit 30 is configured to direct some or all of the plurality of drums 26 to move to one of the leading edge open position or to the trailing edge open position in response to the measurement from the sensor 66 even though no preprogrammed aircraft maneuver is detected.

Alternatively, there may be a delay in the measurements from the sensor 66. Therefore, the control unit 30 is also configured to direct some or all of the drums 26 to move to one of the leading edge open position or to the trailing edge open position when the one of the preprogrammed aircraft maneuvers is detected, even though the measurements from the sensor 66 are within the predetermined thresholds.

In some embodiments, the control unit 30 may detect one of the preprogrammed aircraft maneuvers, but the measurements from the sensors 66 are within the predetermined threshold. If so, the control unit 30 may direct some or all of the drums 26 to remain in the current position.

In some embodiments, the inlet distortion mitigation system 22 may utilize a machine learning algorithm. The machine learning algorithm may track inputs, for example, aircraft speed, orientation, altitude, and/or fan speed versus a fan response, as well positioning of the drums 26, and learn how to move the inlet distortion mitigation system 22 to minimize stall margin loss. The mitigation system 22 may utilize the machine learning algorithm to gather data collected from the sensors 66 and/or other systems integrated with the engine 110 and evaluate the data, for example, to learn the correlation between certain environmental factors and/or inputs and stall margin. The algorithm may determine and learn how to minimize stall margin loss based on evaluation of the data collected, and be used by the system 22 to anticipate unfavorable conditions and better control the drums 26 to mitigate stall margin loss.

Turning again to the fan case assembly 10, the fan case assembly 10 extends circumferentially at least partway about the central axis 11 in the illustrative embodiment. In some embodiments, the fan 112 may include multiple fan case assemblies 10 arranged circumferentially about the axis 11 to form a full hoop. In other embodiments, the fan case assembly 10 may be annular and extends circumferentially about the axis 11. In some embodiments, the case 20 may extend around the axis 11, while the plenum 24 only extends partway about the axis 11.

In some embodiments, the fan 112 may include multiple fan case assemblies 10 spaced apart circumferentially about the axis 11 to define segments between each fan case assembly 10. The segments between the fan case assemblies 10 may not have a plenum 24 so that the plenums 24 of each of the fan case assemblies 10 are independent from each other.

The case 20 includes a forward section 32 and an aft section 34 as shown in FIG. 4. The aft section 34 is configured to be coupled to the forward section 32 to trap the plurality of drums 26 axially therebetween in the plenum 24.

In the illustrative embodiment, the plenum 24 is formed in the case 20 so that the plenum 24 extends axially across the tips of the fan blades 14 between the leading edge 16 and the trailing edge 18 of the fan blades 14 as shown in FIGS. 2, and 5-7. Each drum 26 extends axially across the tips of the fan blades 14. The slots 28A, 28B of each drum 26 extend a respective portion of the axial length between the leading edge 16 and the trailing edge 18 in the illustrative embodiment. In some embodiments, at least a portion of one of the slots 28A, 28B may extend forward/aft of the leading and trailing edges 16, 18.

In the illustrative embodiment, the plenum 24 has a rectangular cross-sectional shape. In some embodiments, the plenum 24 may have a forward-leaning and/or curved cross-sectional shape. In other embodiments, the plenum 24 may have another cross-sectional shape.

In the illustrative embodiment, the case 20 is formed to include a plurality of openings 36 that open to the gas path 25 and the plenum 24 as shown in FIGS. 3, 4, and 8A-12B. The openings 36 are spaced apart circumferentially about the central axis 11 to define partitions 38 in the case 20. Each drum 26 is arranged in the plenum 24 so that the drum 26 is aligned with one of the openings 36 and each partition 38 is arranged between adjacent drums 26 as shown in FIGS. 8A-12B. In the illustrative embodiment, each of the drums 26 extends partway into the corresponding opening 36. In this way, the outer surface 46 of each drum 26 cooperates with the inner surface 21 of the case 20 to define the outer boundary of the gas path 25.

It will be understood that the spacing of the drums 26 in FIGS. 1-12B are not to scale. For example, the drums 26 may be circumferentially spaced closer together or may be circumferentially spaced further apart in some embodiments.

In some embodiments, the plenum 24 formed in the case 20 may completely open to the gas path 25 such that there are no partitions 38. The drums 26 may be arranged closer together to minimize gaps there between and prevent fluid communication between the gas path 25 and the plenum 24. In some embodiments, the assembly may include seals between adjacent drums 26 to limit leakage therebetween. In some embodiments, the partitions 38 may be formed between some, but not every drum 26.

If the case 20 is a split case, like as shown in FIG. 4, the partitions 38 may be included in the forward case 32. In some embodiments, the partitions 38 may be part of the aft case 34. In some embodiments, the partitions 38 may be included in both the forward and aft cases 32, 34. In other illustrative embodiments, the partitions 38 may partially block the slot 28 of the drums, for example, when the drums are in an intermediate position.

In illustrative embodiments, as shown in FIG. 7, the case 20 may include a divider 32', which splits the plenum 24 axially into a forward plenum 24A and an aft plenum 24B. The divider 32' may split the plenum 24 such that the leading edge slot 28A and the trailing edge slot 28B are not in fluid commination with each other via the plenum 24, or in other words air cannot flow between the leading edge slot 28A and the trailing edge slot 28B, or between the forward plenum 24A and the aft plenum 24B. The forward plenum 24A is in fluid communication with the corresponding leading edge slots 28A of the plurality of drums 26, and the aft plenum 24B is in fluid communication with the corresponding trailing edge slots 28B of the plurality of drums 26. In some embodiments, the divider 32' may be part of the forward section 32 or the aft 34 section. Alternatively, the case 20 may not include a divider 32', as shown in FIGS. 5 and 6.

In illustrative embodiments, the divider 32' enables the inlet distortion mitigation system 22 to utilize different sets of drums, for example, a first set enabling a relatively low count opening at the leading edge 16 of the fan blades 14. For example, the first set of drums may be configured to position every fourth drum to be in the leading edge open position, as shown in FIGS. 9A and 9B, transferring flow around the forward plenum 24A. Meanwhile, the inlet distortion mitigation system 22 may also have a second set of drums enabling a relatively high count opening at the trailing edge 18 of the fan blades 14. For example, the second set of drums may be configured to position every other drum in the trailing edge open position, as shown in FIGS. 10A and 10B, transferring flow around the aft plenum 24B. Both the forward plenum 24A and the aft plenum 24B configured to transfer flow circumferentially and independently from one another.

The inlet distortion mitigation system 22 includes the plurality of drums 26 and the control unit 30 as shown in FIGS. 2-4. Each of the drums 26 includes a drum body 40 and a pair of pegs 42, 44 as shown in FIG. 4. The drum body 40 extends between a first axial end 40A and a second axial end 40B spaced apart axially from the first axial end 40A. The drum body 40 defines an outer surface 46 that extends between the first and second axial ends 40A, 40B. The pair of pegs 42, 44 each extend from one of the axial ends 40A, 40B of the drum body 40 to the case 20 to couple the respective drum 26 to the case 20. The pair of pegs 42, 44 extend axially from the first and second axial ends 40A, 40B of the drum body 40 to fit into peg holes 42H, 44H formed in the forward and aft sections 32, 34 of the case 20.

The drum body 40 is formed to define the leading edge slot 28A and the trailing edge slot 28B as shown in FIGS. 3-7. The slots 28A, 28B extend entirely through the drum body 40 axially along a portion of the axial length between the first and second axial ends 40A, 40B of the drum body 40.

The drums 26 are rotatable between the closed position, the leading edge open position, and the trailing edge open position to control fluid communication between the gas path 25 and the plenum 24. The drums 26 are rotated about the respective drum axis A to change the angle or position of the slots 28A, 28B of the drums 26 relative to the gas path 25, thereby exposing at least one of the slots 28A, 28B to the gas path 25 to direct flow into the plenum 24.

In the closed position, both the leading edge slot 28A and the trailing edge slot 28B of each drum 26 is closed off from the gas path 25. In the leading edge open position, the leading edge slot 28A of each drum 26 is positioned to extend radially relative to the central axis or perpendicular to the inner surface 21 of the case 20 and the trailing edge slot 28B is closed off from the gas path 25. In the trailing edge open position, the trailing edge slot 28B of each drum 26 is positioned to extend radially relative to the central axis or perpendicular to the inner surface 21 of the case 20, and the leading edge slot 28A is closed off from the gas path.

In the closed position, the leading edge slot 28A is at a first leading edge closed angle 26A as shown in FIG. 8A and the trailing edge slot 28B is at a first trailing edge closed angle 26B as shown in FIG. 8B. In the illustrative embodiment, the first leading edge closed angle 26A and the first trailing edge closed angle 26B are each about 45 degrees. In the leading edge open position, the leading edge slot 28A is at a leading edge open angle 26A as shown in FIG. 9A and the trailing edge slot 28B is at a second trailing edge closed angle 26B as shown in FIG. 9B. In the illustrative embodiment, the leading edge open angle 26A is about 90 degrees and the second trailing edge closed angle 26B is about 45 degrees. In the trailing edge open position, the leading edge slot 28A is at a second leading edge closed angle 26A as shown in FIG. 10A and the trailing edge slot 28B is at a trailing edge open angle 26B as shown in FIG. 10B. In the illustrative embodiment, the trailing edge open angle 26B is about 90 degrees and the second leading edge closed angle 26A is about 45 degrees.

In the illustrative embodiment, the plurality of drums 26 may rotate in either direction about the drum axis A between the different positions. In some embodiments, the plurality of drums 26 may be configured to rotate in a first direction about the drum axis A from the closed position to one of the leading edge open position or the trailing edge open position. The drums 26 may be configured to rotate in a second direction about the drum axis A opposite the first direction to go back to the closed position. In some embodiments, the drums 26 may be configured to continue to rotate in the first direction to go back to the closed position.

The plurality of drums 26 may be configured to rotate in the second direction about the drum axis A from the closed position to one of the leading edge open position or the trailing edge open position. The drums 26 may be configured to rotate in the first direction about the drum axis A opposite the second direction to go back to the closed position. In some embodiments, the drums 26 may be configured to continue to rotate in the second direction to go back to the closed position.

In some embodiments, each of the drums 26 may be configured to rotate 180 degrees about the drum axis A. The plurality of drums 26 may configured to rotate in the first direction 180 degrees about the drum axis A from the closed position to another closed position with the drum 26 flipped. The plurality of drums 26 may configured to rotate in the second direction 180 degrees about the drum axis A from the closed position back to the original closed position with the drum 26. In some embodiments, each of the drums 26 may be configured to rotate 360 degrees about the drum axis A in either the first direction and/or the second direction.

The control unit 30 includes at least one actuator 60, a controller 62, a memory 64, and at least one sensor 66 as shown in FIGS. 3 and 8A-12B. The actuator 60 is coupled to drums 26. The actuator 60 is configured to drive the rotating motion of the drums 26. The controller 62 is coupled to the actuator 60 to direct the actuator 60 to rotate the drums 26 between the different positions.

The actuator 60 is configured to rotate the drums 26 between the closed position as shown in FIGS. 7, 8A, and 8B, the leading edge open position as shown in FIGS. 5, 9A, and 9B, and the trailing edge open position as shown in FIGS. 6, 10A, and 10B. The controller 62 is configured to direct the actuator 60 to rotate the drums 26 between the different positions in response to preselected operating conditions. The preselected operating conditions include the plurality of preprogrammed aircraft maneuvers stored on the memory 64 included in the control unit 30.

The controller 62 of the control unit 30 is configured to detect a preprogrammed aircraft maneuver included in the plurality of preprogrammed aircraft maneuvers on the memory 64. Once the preprogrammed aircraft maneuver is detected, the controller 62 directs the actuator 60 to rotate some or all of the drums 26 to a corresponding position in response to detecting the preprogrammed aircraft maneuver.

In some embodiments, multiple drums 26 may be coupled together to sync movement of the drums 26. The drums 26 may be coupled or linked together so that when the controller 62 directs the actuator 60 to rotate the drums 26, the actuator 60 moves to simultaneously rotate the plurality of coupled drums 26 to the desired position.

In some embodiments, different sets of drums 26 may be coupled together. The control unit 30 may include multiple actuators 60 each coupled to a respective different set of coupled drums 26 to control the positions of the drums 26 in groups so that some of the drums 26 move together in unison, while other drums 26 are independently controlled from the first group.

In some embodiments, the control unit 30 includes a separate actuator 60 for each drum 26. Each actuator 60 may be coupled to one of the respective drums 26. In this way, the controller 62 independently controls the position of each drum 26.

In some embodiments, the actuator 60 may include pneumatic or electric actuators, or combinations of hydraulic, pneumatic, and electric. Any other actuator known to a person skilled in the art could be utilized as well.

The controller 62 of the control unit 30 is configured to direct the actuator(s) 60 to rotate some or all of the drums 26 from the closed position to one of the leading edge open position or the trailing edge open position based on the detected preprogrammed aircraft maneuver. As shown in FIGS. 8A and 8B, the controller 62 has directed the actuator (s) 60 to rotate all of the drums 26 to the closed position. As shown in FIGS. 9A and 9B, the controller 62 has directed the actuator(s) 60 to rotate all of the drums 26 to the leading edge open position. As shown in FIGS. 10A and 10B, the controller 62 has directed the actuator(s) 60 to rotate all of the drums 26 to the trailing edge open position.

Figures 11A, 11B:
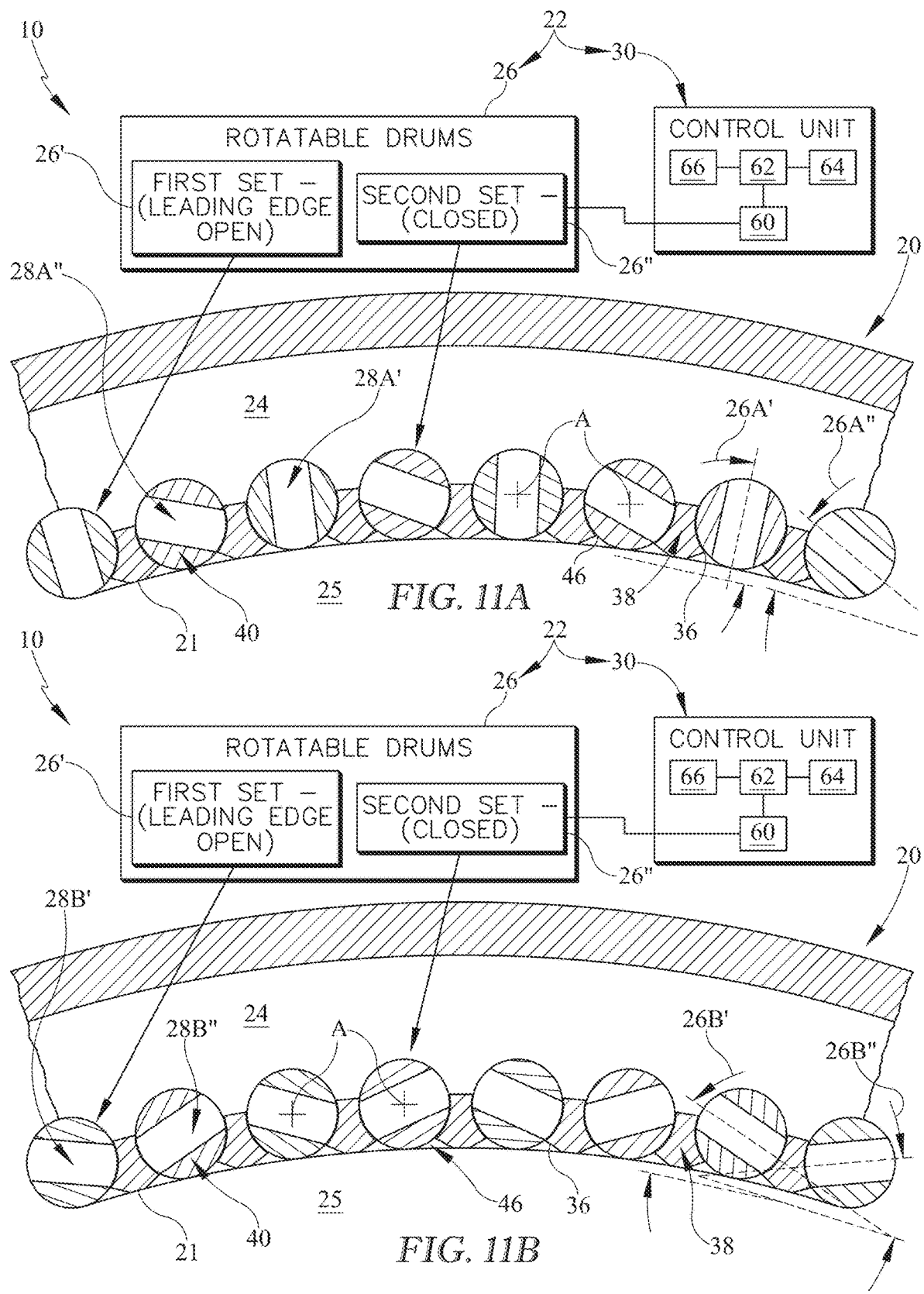
FIG. 11A is an axial cross-section view at the leading edge slots of the fan case assembly of FIG. 3 showing the plurality of drums may be rotated in different sets, the sets of drums includes a first set of drums and a second set of drums alternated circumferentially between the first set of drums, and further showing the first set of drums are in the leading open position like as shown in FIG. 9A so that the leading edge slots of the first set of drums extend axially relative to the central axis to open the leading edge slot to the gas path to allow fluid communication between the gas path and the plenum through the leading edge slot, the second set of drums are in the closed position like as shown in FIG. 8A so that the leading edge slot of the second set of drums is closed off from the gas path to block fluid communication between the gas path and the plenum through the leading edge slot.
FIG. 11B is an axial cross-section view at the trailing edge slots of the fan case assembly of FIG. 3 showing the plurality of drums may be rotated in different sets, the sets of drums includes a first set of drums and a second set of drums alternated circumferentially between the first set of drums, and further showing the first set of drums are in the leading open position like as shown in FIG. 9B in which the trailing edge slot of the corresponding drum is closed off from the gas path to block fluid communication between the gas path and the plenum through the trailing edge slot, the second set of drums are in the closed position like as shown in FIG. 8B in which the trailing edge slot of the corresponding drum is also closed off from the gas path to block fluid communication between the gas path and the plenum through the trailing edge slot.

Depending on the preprogrammed aircraft maneuver, the controller 62 of the control unit 30 may direct certain actuators 60 to only rotate certain drums 26 to one of the leading edge open position or the trailing edge open position, while keeping others in the closed position. As shown in FIGS. 11A and 11B, the controller 62 has directed the actuator(s) 60 to rotate some of the drums 26, or a first set of drums 26', to the leading edge open position, while keeping other drums 26, or a second set of drums 26", in the closed position.

In the leading edge open position, the leading edge slot 28A' of the first set of drums 26' is at the leading edge open angle 26A' as shown in FIG. 11A and the trailing edge slot 28B' of the first set of drums 26' is at the second trailing edge closed angle 26B' as shown in FIG. 11B. In the closed position, the leading edge slot 28A" of the second set of drums 26" is at the first leading edge closed angle 26A" as shown in FIG. 11A and the trailing edge slot 28B" of the second set of drums 26" is at the first trailing edge closed angle 26B" as shown in FIG. 11B. The leading edge open angle 26A', the first leading edge closed angle 26A", the first trailing edge closed angle 26B", and the second trailing edge closed angle 26B' may be the same or substantially similar to the leading edge open angle 26A, the first leading edge closed angle 26A, the first trailing edge closed angle 26B, and the second trailing edge closed angle 26B, respectively, as discussed above with respect to FIGS. 8A-10B. In the illustrative embodiment, the leading edge open angle 26A' is about 90 degrees and the closed angles 26A", 26B', and 26B" are each about 45 degrees.

FIGS. 11A and 11B show the first set of drums 26' at the same, leading edge open position and the second set of drums 26" at the same, closed position. FIG. 11A shows a cross-section view at the leading edge slot 28A of the first set of drums 26' in the leading edge open position and at the leading edge slot 28A of the second set of drums 26" in the closed open position. FIG. 11B shows a cross-section view at the trailing edge slot 28B of the first set of drums 26' in the leading edge open position and at the trailing edge slot 28B of the second set of drums 26" in the closed open position. In other words, FIG. 11A and FIG. 11B show the same sets of drums 26', 26" in the same respective positions, but FIG. 11A shows an axial cross section at a first location along an axis A of the drums 26', 26", and FIG. 11B shows an axial cross section at a second location along the axis A of the drums 26', 26", axially aft of the first location shown in FIG. 11A.

Figures 12A, 12B:
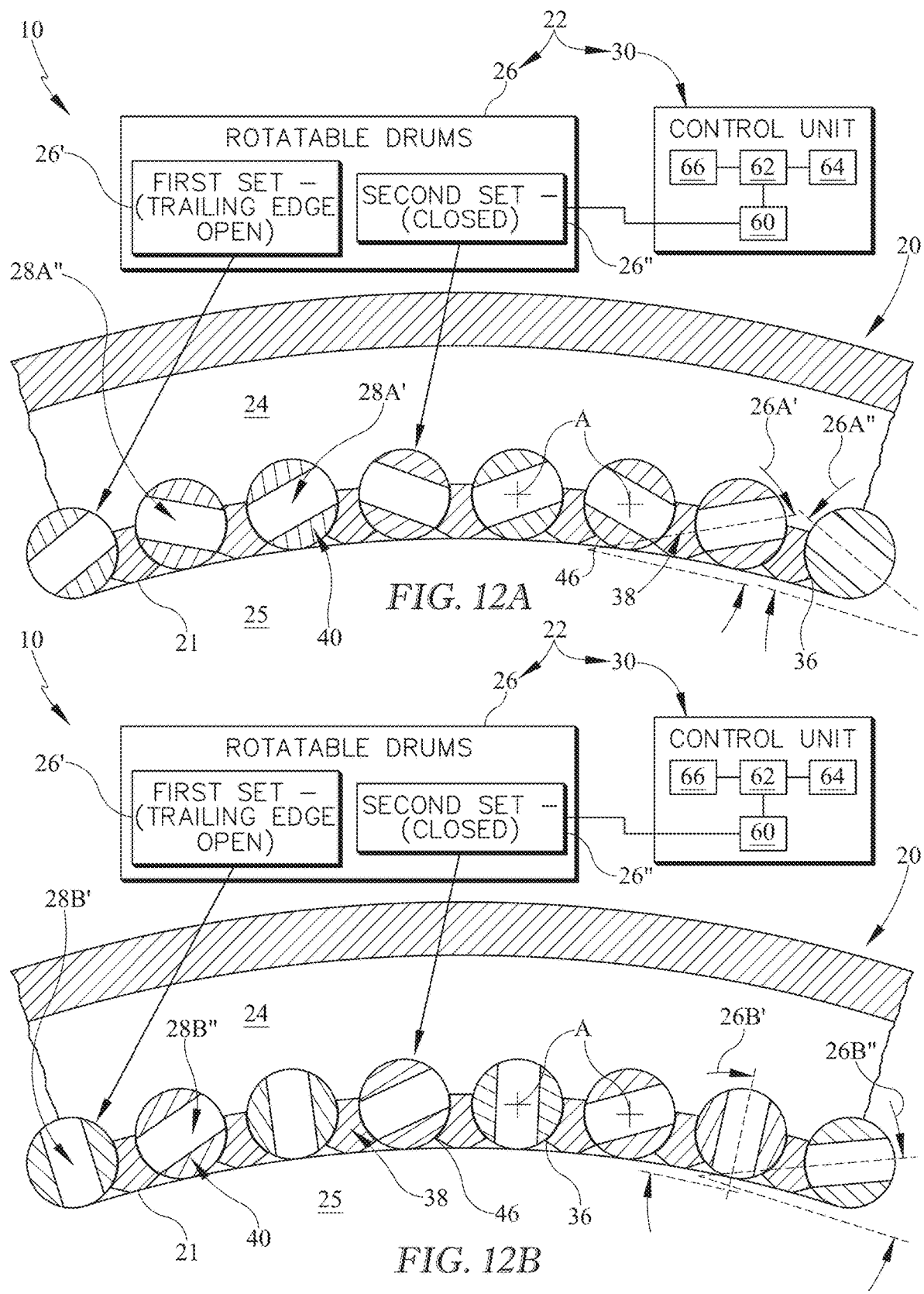
FIG. 12A is an axial cross-section view at the leading edge slots of the fan case assembly of FIG. 3 showing the plurality of drums may be rotated in different sets, the sets of drums includes a first set of drums and a second set of drums alternated circumferentially between the first set of drums, and further showing the first set of drums are in the trailing open position like as shown in FIG. 10A so that the leading edge slot of the corresponding drum is closed off from the gas path to block fluid communication between the gas path and the plenum through the leading edge slot, the second set of drums are in the closed position like as shown in FIG. 8A so that the leading edge slot of the second set of drums is also closed off from the gas path to block fluid communication between the gas path and the plenum through the leading edge slot.
FIG. 12B is an axial cross-section view at the trailing edge slots of the fan case assembly of FIG. 3 showing the plurality of drums may be rotated in different sets, the sets of drums includes a first set of drums and a second set of drums alternated circumferentially between the first set of drums, and further showing the first set of drums are in the trailing open position like as shown in FIG. 10B so that the trailing edge slot of the corresponding drum extends axially relative to the central axis to open the trailing edge slot to the gas path to allow fluid communication between the gas path and the plenum through the trailing edge slot near the trailing edge of the drum, the second set of drums are in the closed position like as shown in FIG. 8B in which the trailing edge slot of the corresponding drum is closed off from the gas path to block fluid communication between the gas path and the plenum through the trailing edge slot.

As shown in FIGS. 12A and 12B, the controller 62 has directed the actuator(s) 60 to rotate some of the drums 26, or the first set of drums 26', to the trailing edge position, while keeping other drums 26, or a second set of drums 26", in the closed position. In the trailing edge open position, the leading edge slot 28A' of the first set of drums 26' is at the second leading edge open angle 26A' as shown in FIG. 12A and the trailing edge slot 28B' of the first set of drums 26' is at the trailing edge open angle 26B' as shown in FIG. 12B. In the closed position, the leading edge slot 28A" of the second set of drums 26" is at the first leading edge closed angle 26A" as shown in FIG. 12A and the trailing edge slot 28B" of the second set of drums 26" is at the first trailing edge closed angle 26B" as shown in FIG. 12B. The trailing edge open angle 26B', the first trailing edge closed angle 26B", the first leading edge closed angle 26A", and the second leading edge closed angle 26A' may be the same or substantially similar to the trailing edge open angle 26B, the first trailing edge closed angle 26B, the first leading edge closed angle 26A, and the second leading edge closed angle 26A, respectively, as discussed above with respect to FIGS. 8A-10B. In the illustrative embodiment, the trailing edge open angle 26B' is about 90 degrees and the closed angles 26A', 26A", and 26B" are each about 45 degrees.

FIGS. 12A and 12B show the first set of drums 26' at the same, trailing edge open position and the second set of drums 26" at the same, closed position. FIG. 12A shows a cross-section view at the leading edge slot 28A of the first set of drums 26' in the trailing edge open position and at the leading edge slot 28A of the second set of drums 26" in the closed open position. FIG. 12B shows a cross-section view at the trailing edge slot 28B of the first set of drums 26' in the trailing edge open position and at the trailing edge slot 28B of the second set of drums 26" in the closed open position. In other words, FIG. 12A and FIG. 12B show the same sets of drums 26', 26" in the same respective positions, but FIG. 12A shows an axial cross section at a first location along an axis A of the drums 26', 26", and FIG. 12B shows an axial cross section at a second location along the axis A of the drums 26', 26", axially aft of the first location shown in FIG. 12A.

In the illustrative embodiment, the first set of drums 26' is alternated between the second set of drums 26" as shown in FIGS. 11A, 11B, 12A, and 12B. In some embodiments, the different sets 26', 26" are arranged in series. In some embodiments, the different sets 26', 26" are arranged in groups spaced apart circumferentially. In some embodiments, the different sets 26', 26" may have drums 26 located at different circumferential locations spaced about the axis 11.

In the illustrative embodiment, the number of drums 26 in the first set of drums 26' is equal to the number of drums 26 in the second set of drums 26". In some embodiments, the number of drums 26 in one set 26', 26" may be less than or greater than the number of drums 26 in the other set 26', 26". In some embodiments, the controller 62 may not control the drums 26 in sets, but rather direct certain actuator(s) 60 to rotate certain drum(s) 26 to one of the leading edge open position or the trailing edge open position, while keeping other drums 26 in the closed position.

Additionally, the controller 62 of the control unit 30 may direct the actuator(s) 60 to keep some of the drums 26 to in the closed position, while rotating some of the drums 26 to the leading edge open position and others to the trailing edge open position. The controller 62 of the control unit 30 is configured to direct the actuator(s) 60 to rotate some of the drums 26 to the leading edge open position while rotating others to the trailing edge open position. In other words, the control unit 30 is configured to individual vary the angle of each of the slots 28A, 28B of the drums 26.

In some embodiments, the control unit 30 may control the plurality of rotatable drums 26 in more than two sets. In some embodiments, the plurality of drums 26 may have more than two sets of drums. In some embodiments, may have less than two sets of drums.

The preselected operating conditions may further include a sensor input from the sensor 66 or sensors 66 included in the control unit 30. The sensor 66 is configured to measure one of pressure, air speed, and acceleration. The sensor 66 is also configured to detect distortion, fan stall, and/or other aeromechanical issues. In some embodiments, the control unit 30 includes a plurality of sensors 66 each configured to measure one of pressure, air speed, and acceleration and/or detect distortion, fan stall, and/or other aeromechanical issues.

The sensor 66 may include one of or a combination of dynamic sensors, static wall pressure sensors, altitude sensors, sensors configured to detect the angle of attack of the plurality of fan blades 14, sensors configured to detect the tip timing of the plurality of fan blades 14, and air speed sensors. In some embodiments, the sensor 66 may be a dynamic pressure transducer. The sensor 66 may also be a sensor configured to measure a rotational speed of the fan blades 14, which could be used along with an additional sensor that is a dynamic pressure transducer. In some embodiments, the sensor 66 may be a sensor configured to measure a rotation speed of another section of the engine 110.

The controller 62 of the control unit 30 is configured to receive a measurement from the sensor 66 or sensors 66 and direct the actuator 60 to rotate some or all of the drums 26 to a corresponding position in response to the measurement of the at least one sensor 66. The controller 62 of the control unit 30 may be configured to direct actuator 60 to rotate some or all of the drums 26 to the closed position when the measurements from the sensor 66 are within a predetermined threshold.

Then, when the measurement from the sensor 66 is outside of the predetermined threshold, the controller 62 directs the actuator 60 to rotate some or all of the drums 26 to one of the leading edge open position or the trailing edge open position. Based on the difference of the measurement from the sensor 66 compared to the predetermined threshold, the controller 62 may vary the position of the drums 26 to control the amount of fluid communication between the gas path 25 and the plenum 24 through the slots 28A, 28B.

In some embodiments, the controller 62 of the control unit 30 may be configured to use a combination of the sensor measurements and the detected preprogrammed aircraft maneuver to control the position of the drums 26. For example, when the controller 62 of the control unit 30 detects a preprogrammed aircraft maneuver and the measurement is outside of the predetermined threshold, the controller 62 directs the actuator 60 to rotate some or all of the drums 26 to one of the leading edge open position or the trailing edge open position.

In some embodiments, the controller 62 of the control unit 30 is configured to use the measurements from the sensor 66 to anticipate the aircraft maneuver. The controller 62 of the control unit 30 is configured to direct the actuator 60 to rotate some or all of the drums 26 to one of the leading edge open position or the trailing edge open position in response to the measurement from the sensor 66 even though no preprogrammed aircraft maneuver is detected.

Alternatively, there may be a delay in the measurements from the sensor 66. Therefore, the controller 62 of the control unit 30 is also configured to direct the actuator 60 to rotate some or all of the drums 26 to one of the leading edge open position or the trailing edge open position when the one of the preprogrammed aircraft maneuvers is detected, even though the measurements from the sensor 66 are within the predetermined thresholds.

In some embodiments, the controller 62 of the control unit 30 may detect one of the preprogrammed aircraft maneuvers, but the measurements from the sensors 66 are within the predetermined threshold. If so, the controller 62 of the control unit 30 may direct some or all of the drums 26 to remain in the current position.

A method of operating the inlet distortion mitigation system 22 may include several steps. During normal cruise conditions, the controller 62 directs the actuator 60 to locate the rotatable drums 26 in the closed position. If the controller 62 detects one of a preselected operating condition other than the cruise condition, the controller 62 directs the actuator 60 to rotate the drums 26 to one of the leading edge open position or the trailing edge open position depending on the operating condition detected to minimize the negative effects of pressure and swirl distortions to improve stall margin.

The method further includes continually adjusting the position of some or all of the drums 26 based on the preselected operating condition of the engine 110. If the controller 62 detects the cruise condition, the controller 62 directs the actuator 60 to rotate the drums 26 back to the closed position. In other instances, the controller 62 may direct the actuator 60 to control the position of the drums 26 as discussed above based on the preprogrammed aircraft maneuvers and/or the measurements from the sensors.

When dealing with embedded inlet distortion, there may be a steep trade between stall margin and performance of the engine. There may be points during a mission or moments with maneuvers where it may be desirable to incorporate a different available stall margin or to be able to more evenly distribute flows. Attempting to solve the worst stall condition, while maintaining performance over all of the cycle or flight conditions may be difficult and result in compromised efficiency or a limited flight envelope.

The fan 112 includes an inlet distortion mitigation system 22 which includes a plurality of rotatable drums 26 configured to control fluid communication between the plenum 24 and the gas path 25. The plurality of rotatable drums 26 may be rotated all together or in sets/groups to expose the tips of the fan blades 14 to the plenum 24 radially outward of the drums 26.

The flow path or gas path 25 between the drums 26 is a static flow path or has partitions 38 so when the slots 28A, 28B are rotated away from the gas path 25, the gas path 25 is relatively smooth. Then the drums 26 may be rotated to expose the slots 28A, 28B to the gas path 25 and direct flow into the plenum 24.

In the illustrative embodiment, the partitions 38 may block part of one of both of the slots 28A, 28B in certain positions to vary the size of the opening to the slot 28 thereby modulating the flow therethrough. In some embodiments, the partitions 38 do not block the opening to one or both of the slots 28A, 28B such that in the leading edge open or the trailing edge open positions at least one of the slots 28A, 28B is completely open to the gas path 25.

The rotating drums 26 may be incorporated into the fan case 20 or into liners and operated via a variable geometry system similar to variable vanes. The actuator(s) 60 may be similar to the variable geometry system used with variable vanes.

In the first condition, or the closed position, any opening to the plenum 24 would be closed so no additional stall margin is created, but performance is not compromised. In a second condition, or the leading edge open position or the trailing edge open position, the plurality of drums 26 rotates to permit flows into the plenum 24. This permits air pressure and flows to better equalize circumferentially and provides additional stall margin benefit. The angle of the slots 28A, 28B of the drums 26 may be adjusted to tune the arrangement to particular needs or conditions.

The plurality of drums 26 permit the fan 112 to optimize efficiency at a cruise point with limited distortion, while being able to maintain adequate stall margin at another condition. By activating the rotatable drums 26 to trade efficiency for stall margin improvement, but not have to live with that trade at all times, the inlet distortion mitigation system 22 allows optimization of the fan 112.

The plenum 24 uses rotating of the drums 26 to open or close the passage of air to the plenum 24. The slots 28A, 28B of the drums 26 may be rotated to a range of angles between 0 to about 90 degrees.

This may be done with all drums 26 controlled the same, or with different angles for different sectors via ganging. The channel or plenum 24 itself may have different cross-sections when viewed in the circumferential direction. In some embodiments, the cross-section of the plenum 24 is a forward-leaning cross-sectional shape outboard of the space for the drums 26. In some embodiments, the cross-section of the plenum 24 may have different shape. In the illustrative embodiment, the cross-section of the plenum 24 is rectangular when viewed circumferentially about the axis 11.

In some embodiments, the drums 26 may be ganged by sectors and have some drums 26 at different circumferential locations be open to flow into the plenum 24 and other drums 26 to help flow out of the plenum. Other drums 26 in the middle may be closed.

The control unit 30 is configured to use sensor inputs from a sensor 66 to control operation of the drums 26. The sensor 66 may include one of or a combination of a static wall pressure sensor, an altitude sensor, sensors configured to detect twisting of the fan blades 14, sensors configured to detect the tip timing of the fan blades 14, sensors configured to measure a rotational speed of the fan blades 14, a dynamic pressure transducer sensor. The combination of some sensors may provide data to engage mitigation of the effects of distortion, while other sensors may detect the maneuvers or mission phase.

For example, altitude and fan speed may provide data to engage mitigation, while also providing maneuver detection or regime/mission phase framing of control logic. Additionally, static wall pressure, dynamic pressure transducers, blade tip timing, blade untwist as well as fan speed and altitude may be used in distortion/effect detection for the control logic.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising a case that extends circumferentially at least partway about a central axis of the fan case assembly to define an outer boundary of a gas path of the gas turbine engine, the case formed to define a plenum that extends circumferentially at least partway about the central axis, a plurality of drums arranged in the plenum and spaced circumferentially about the central axis, each drum of the plurality of drums shaped to include a first slot and a second slot spaced apart axially along the drum that each extend through the corresponding drum, each drum of the plurality of drums configured to rotate about a respective drum axis between a closed position in which the first slot and the second slot of the corresponding drum are both closed off from the gas path to block fluid communication between the gas path and the plenum through either the first slot or the second slot, a first open position in which the first slot of the corresponding drum is open to the gas path to allow fluid communication between the gas path and the plenum through the first slot while the second slot remains closed off from the gas path, and a second open position in which the second slot of the corresponding drum is open to the gas path to allow fluid communication between the gas path and the plenum through the second slot while the first slot remains closed off from the gas path, and a control unit configured to rotate the plurality of drums about the respective drum axis between the closed position, the first open position, and the second open position in response to preselected operating conditions to minimize negative effects pressure and swirl distortions in the gas turbine engine to improve stall margin.

2. The fan case assembly of claim 1, wherein the first slot is disposed closer to a first axial end of the drum that the second slot and the second slot is disposed closer to a second axial end of the drum than the first slot, the second axial end opposite from the first axial end.

3. The fan case assembly of claim 1, wherein the first slot is disposed closer to a leading edge of a fan blade that the second slot and the second slot is disposed closer to a trailing edge of the fan blade than the first slot.

4. The fan case assembly of claim 1, wherein the first slot extends through the corresponding drum at a first angle relative to the gas path and the second slot extend through the corresponding drum at a second angle relative to the gas path, the second angle different from the first angle.

5. The fan case assembly of claim 1, wherein the plurality of drums includes a first set of drums and a second set of drums and the control unit is configured to rotate the first set of drums between the closed position, the first open position, and the second open position independent of the second set of drums.

6. The fan case assembly of claim 5, wherein the first set of drums are alternated circumferentially between the second set of drums.

7. The fan case assembly of claim 1, wherein each drum of the plurality of drums has a cylindrical shape that defines a first end, a second end spaced apart axially from the first end, and an outer surface that extends axially between the first end and the second end and circumferentially about the corresponding drum axis, and wherein the outer surface of each drum of the plurality of drums cooperates with an inner surface of the gas path to define a portion of the outer boundary of the gas path when each drum of the plurality of drums is in the closed position to block fluid communication between the gas path and the plenum.

8. The fan case assembly of claim 1, wherein each drum of the plurality of drums has a cylindrical shape that defines a first end, a second end spaced apart axially from the first end, and an outer surface that extends axially between the first end and the second end and circumferentially about the corresponding drum axis, and wherein the outer surface of each drum of the plurality of drums at an axial position of the second slot cooperates with an inner surface of the gas path to define a portion of the outer boundary of the gas path when each drum of the plurality of drums is in the first open position to block fluid communication between the gas path and the plenum at the second slot.

9. The fan case assembly of claim 1, wherein each drum of the plurality of drums has a cylindrical shape that defines a first end, a second end spaced apart axially from the first end, and an outer surface that extends axially between the first end and the second end and circumferentially about the corresponding drum axis, and wherein the outer surface of each drum of the plurality of drums at an axial position of the first slot cooperates with an inner surface of the gas path to define a portion of the outer boundary of the gas path when each drum of the plurality of drums is in the second open position to block fluid communication between the gas path and the plenum at the first slot.

10. The fan case assembly of claim 1, wherein the control unit includes at least one actuator coupled to the plurality of drums and configured to drive rotation of the plurality of drums between the closed position, the first open position, and the second open position, and a controller coupled to the at least one actuator and configured to direct the at least one actuator to move the plurality of drums to the closed position when the gas turbine engine is in a cruise condition included in the preselected operating conditions.

11. The fan case assembly of claim 10, wherein the control unit further includes a memory coupled to the controller, the memory including a plurality of preprogrammed aircraft maneuvers that each correspond to one of the closed position, the first open position, and the second open position, and wherein the controller is configured to detect a preprogrammed aircraft maneuver included in the plurality of preprogrammed aircraft maneuvers on the memory and direct the at least one actuator to move the plurality of drums to a corresponding position in response to detecting the preprogrammed aircraft maneuver.

12. The fan case assembly of claim 10, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the plurality of drums to a corresponding position in response to the measurement of the at least one sensor.

13. A gas turbine engine comprising
  a fan including a fan rotor configured to rotate about an axis of the gas turbine engine and a plurality of fan blades coupled to the fan rotor for rotation therewith and
  a fan case assembly adapted for use with the gas turbine engine, the fan case assembly comprising
    a case that extends circumferentially at least partway about a central axis of the fan case assembly to define an outer boundary of a gas path of the gas turbine engine, the case formed to define a plenum that extends circumferentially at least partway about the central axis,
    a plurality of drums arranged in the plenum, each drum of the plurality of drums shaped to include a first slot and a second slot spaced apart axially from the first slot that each extend through the corresponding drum, each drum of the plurality of drums configured to rotate about a respective drum axis between a closed position in which both the first slot and the second slot of the corresponding drum are closed off from the gas path to block fluid communication between the gas path and the plenum through either the first slot or the second slot, and an open position in which one of the first slot and the second slot of the corresponding drum is open to the gas path to allow fluid communication between the gas path and the plenum through one of the first slot and the second slot while the other of the first slot and the second slot is closed off from the gas path, and
    a control unit configured to rotate the plurality of drums about the respective drum axis between the closed position and the open position in response to preselected operating conditions.

14. The fan case assembly of claim 13, wherein the first slot is disposed closer to a first axial end of the drum that the second slot and the second slot is disposed closer to a second axial end of the drum than the first slot, the second axial end opposite from the first axial end.

15. The fan case assembly of claim 13, where each of the plurality of fan blades includes a leading edge and a trailing edge, and wherein the first slot is located closer to the leading edge of the plurality of fan blades than the second slot, and the second slot is located closer to the trailing edge of the plurality of fan blades than the first slot.

16. The fan case assembly of claim 13, wherein the first slot extends through the corresponding drum at a first angle relative to the gas path and the second slot extend through the corresponding drum at a second angle relative to the gas path, the second angle different from the first angle.

17. The fan case assembly of claim 13, wherein the plurality of drums includes a first set of drums and a second set of drums and the control unit is configured to rotate the first set of drums between the closed position and the open position independent of the second set of drums.

18. The gas turbine engine of claim 17, wherein the first set of drums are alternated circumferentially between the second set of drums.

19. The gas turbine engine of claim 13, wherein the control unit includes at least one actuator coupled to the plurality of drums and configured to drive movement of the plurality of drums between the closed position and the open position and a controller coupled to the at least one actuator and configured to direct the at least one actuator to move the plurality of drums to the closed position when the gas turbine engine is in a cruise condition included in the preselected operating conditions.

20. A method comprising
  providing a fan case assembly adapted for use with a gas turbine engine, the fan case assembly including a case that extends circumferentially at least partway about a central axis of the gas turbine engine and formed to define an outer boundary of a gas path of the gas turbine engine, the case formed to define a plenum that extends circumferentially at least partway about the central axis, and a plurality of drums, each drum of the plurality of drums shaped to include a first slot and a second slot extending through the corresponding drum, each drum of the plurality of drums configured to rotate about a respective drum axis,
  locating the plurality of drums in a closed position in which both the first slot and the second slot of the corresponding drum are closed off from the gas path to block fluid communication between the gas path and the plenum through either the first slot or the second slot, and
  rotating the plurality of drums to an open position in which one of the first slot and the second slot of the corresponding drum is open to the gas path to allow fluid communication between the gas path and the plenum through one of the first slot and the second slot while the other of the first slot and the second slot is closed off from the gas path.

* * * * *